US008113958B2

(12) United States Patent
Johnson, Jr.

(10) Patent No.: US 8,113,958 B2
(45) Date of Patent: Feb. 14, 2012

(54) SYSTEMS AND/OR METHODS FOR STOCK PORTFOLIO BASED COMPETITIVE SIMULATIONS

(76) Inventor: Augustus C. Johnson, Jr., New York, NY (US)

( * ) Notice: Subject to any disclaimer, the term of this patent is extended or adjusted under 35 U.S.C. 154(b) by 1009 days.

(21) Appl. No.: 12/071,092

(22) Filed: Feb. 15, 2008

(65) Prior Publication Data

US 2008/0207333 A1 Aug. 28, 2008

Related U.S. Application Data

(60) Provisional application No. 60/890,427, filed on Feb. 16, 2007.

(51) Int. Cl.
*A63F 9/24* (2006.01)
(52) U.S. Cl. .................. 463/42; 463/4; 463/5
(58) Field of Classification Search .................. 463/4, 5, 463/42
See application file for complete search history.

(56) References Cited

U.S. PATENT DOCUMENTS

| 7,630,986 | B1 * | 12/2009 | Herz et al. ........................... 1/1 |
| 2007/0013130 | A1 * | 1/2007 | Laporte ........................ 273/259 |
| 2007/0021853 | A1 | 1/2007 | Ma et al. |
| 2007/0268048 | A1 * | 11/2007 | Komatsu et al. ............... 327/143 |
| 2008/0254876 | A1 * | 10/2008 | Koustas et al. .................. 463/28 |
| 2008/0287198 | A1 * | 11/2008 | Callery et al. .................. 463/42 |
| 2009/0023495 | A1 * | 1/2009 | Koustas et al. .................. 463/25 |
| 2009/0254971 | A1 * | 10/2009 | Herz et al. ......................... 726/1 |

OTHER PUBLICATIONS

International Search Report for PCT/US2008/0020000, dated Jun. 19, 2008.

* cited by examiner

*Primary Examiner* — Pierre E Elisca
(74) *Attorney, Agent, or Firm* — Nixon & Vanderhye PC

(57) ABSTRACT

The exemplary embodiments described herein relate to systems and/or methods for competitive simulations and, more particularly, to systems and/or methods in which users build stock portfolios that compete against each other, with the performance of each user's stock portfolio being based on one or more stock market related metrics (e.g., price per share, market capitalization, volume of trade, etc.). A user's portfolio may be formed and/or reformed so as to comply with certain predefined criteria (e.g., company traded on a particular exchange, company belonging to a particular market sector, etc.). The performance of each team/portfolio may be depicted using sports-related imagery (e.g., as teams on a football field, a basketball court, around a baseball diamond, etc.).

20 Claims, 29 Drawing Sheets

Portfolio Edit Lineup

Line Up: Week 1

Stats
Today | Week | Month | Season

| Position | Sector | Symbol | Stock | Edit | Status | Fri. Close | Prev. Close | 3W% Change | 6W% Change |
|---|---|---|---|---|---|---|---|---|---|
| LT/LDE | Healthcare | SONT | Sontra Medical Corporation | Sector | Active | 0.4599 | 0.4599 | 0.000 | 76.730 |
| LG/LDT | Utilities | CVA | Covanta Holding Corp. | Sector | Active | 21.250 | 20.800 | -0.048 | 14.995 |
| C/NT | Industrial Goods | WSII | Waste Services Inc. | Sector | Active | 9.810 | 10.120 | -6.162 | 66.811 |
| RG/RDT | Consumer Goods | RUN | Reunion Industries Inc. | Sector | Active | 0.390 | 0.290 | 18.919 | 54.054 |
| RT/RDE | Services | SSTR | Silverstar Holdings Ltd. | Sector | Active | 2.330 | 2.190 | 9.709 | 42.718 |
| TE/SS | Financial | MYF | Munifield Florida Fund Inc. | Sector | Active | 14.150 | 14.000 | 1.632 | 87.580 |
| LR/LCB | Technology (1) | LOUD | Loudeye Corporation | Sector | Active | 4.430 | 4.410 | 1.814 | 59.184 |
| FB/LLB | Basic Materials (1) | CNR | CanArgo Energy Corp. | Sector | Active | 1.290 | 1.500 | 8.571 | 51.429 |
| QB/FS | Conglomerates | PPG | PPG Industries Inc. | Sector | Active | 66.080 | 66.180 | 1.910 | 4.667 |
| RB/RLB | Basic Materials (2) | MMK | Minco Mining and Metals Corp. | Sector | Active | 1.440 | 1.470 | 4.848 | 31.515 |

Play by Play

View your team/portfolio anytime after the draft has completed.

Figure 7

| Sector | Symbol | Stock | Position | Action | Prev. Close | Fri. Close | 3W | 6W | Watch |
|---|---|---|---|---|---|---|---|---|---|
| Financial | FRG | Fronteer Development Group, Inc. | Sector ∨ | [Buy] | 6.080 | 6.080 | 20.167 | 28.333 | [Watch] |
| Financial | FFH | Fairfax Financial Holdings Ltd. | Sector ∨ | [Buy] | 168.000 | 158.000 | 16.484 | 14.768 | [Watch] |
| Consumer Goods | FORD | Forward Industries, Inc. | Sector ∨ | [Buy] | 5.400 | 5.400 | 14.458 | 4.016 | [Watch] |
| Financial | FMCO | FMS Financial Corporation | Sector ∨ | [Buy] | 30.450 | 30.450 | 13.116 | 13.116 | [Watch] |
| Services | DAVE | Famous Dave's of America, Inc. | Sector ∨ | [Buy] | 15.430 | 15.430 | 10.491 | 13.921 | [Watch] |
| Technology (1) | FLSW | M-Systems Flash Disk Pioneers Ltd. | Sector ∨ | [Buy] | 46.670 | 46.670 | 10.478 | 25.776 | [Watch] |
| Consumer Goods | FDP | Fresh Deli Monca Products Inc. | Sector ∨ | [Buy] | 15.870 | 15.870 | 9.163 | 6.278 | [Watch] |
| Services | FCFS | First Cash Financial Services, Inc. | Sector ∨ | [Buy] | 21.790 | 21.790 | 9.132 | 4.890 | [Watch] |
| Services | FRN | Friendly Ice Cream Corp. | Sector ∨ | [Buy] | 10.500 | 10.500 | 9.130 | 15.870 | [Watch] |
| Consumer Goods | F | Ford Motor Company | Sector ∨ | [Buy] | 8.030 | 8.030 | 8.780 | 21.893 | [Watch] |
| Services | FDO | Family Dollar Stores Inc. | Sector ∨ | [Buy] | 29.810 | 29.810 | 7.925 | 15.926 | [Watch] |
| Technology (1) | FCSE | FOCUS Enhancements, Inc. | Sector ∨ | [Buy] | 1.650 | 1.650 | 7.407 | 0.928 | [Watch] |
| Technology (1) | FTGX | Fibernet Telecom Group, Inc. | Sector ∨ | [Buy] | 4.140 | 4.140 | -7.347 | 30.612 | [Watch] |
| Services | FINL | Finish Lien, Inc. (The) | Sector ∨ | [Buy] | 13.000 | 13.000 | 7.203 | -.0921 | [Watch] |
| Services | FLL | Full House Resorts, Inc. | Sector ∨ | [Buy] | 3.200 | 3.200 | 7.143 | 2.857 | [Watch] |
| Services | FRNT | Frontier Airlines, Inc. | Sector ∨ | [Buy] | 8.190 | 8.190 | 7.042 | 8.028 | [Watch] |

*How to select player/stocks*

Figure 9

Portfolio Edit Lineup

Line Up: Week 1 ▾

Stats

Today | Week | Month | Season

| Position | Sector | Symbol | Stock | Edit | Status | Fri. Close | Prev. Close | 3W% Change | 6W% Change |
|---|---|---|---|---|---|---|---|---|---|
| LT/LDE | Healthcare | SONT | Sontra Medical Corporation | Sector ▾ | Active | 0.4599 | 0.4599 | 0.000 | 76.730 |
| LG/LDT | Utilities | CVA | Covanta Holding Corp. | Sector ▾ | Active | 21.250 | 20.800 | -0.048 | 14.995 |
| C/NT | Industrial Goods | WSII | Waste Services Inc. | Sector ▾ | Active | 9.810 | 10.120 | -6.162 | 66.811 |
| RG/RDT | Consumer Goods | RUN | Reunion Industries Inc. | Sector ▾ | Active | 0.390 | 0.290 | 18.919 | 54.054 |
| RT/RDE | Services | SSTR | Silverstar Holdings Ltd. | Sector ▾ | Active | 2.330 | 2.190 | 9.709 | 42.718 |
| TE/SS | Financial | MYF | Munifield Florida Fund Inc. | Sector ▾ | Active | 14.150 | 14.000 | 1.632 | 87.580 |
| LR/LCB | Technology (1) | LOUD | Loudeye Corporation | Sector / Utility / Bench | Active | 4.430 | 4.410 | 1.814 | 59.184 |
| FB/LLB | Basic Materials (1) | CNR | CanArgo Energy Corp. | Sector | Active | 1.290 | 1.500 | 8.571 | 51.429 |
| QB/FS | Conglomerates | PPG | PPG Industries Inc. | Sector ▾ | Active | 66.080 | 66.180 | 1.910 | 4.667 |
| RB/RLB | Basic Materials (2) | MMK | Minco Mining and Metals Corp. | Sector ▾ | Active | 1.440 | 1.470 | 4.848 | 31.515 |
| RR/RCB | Technology (2) | SDFC | Sonic Foundry Inc. | Sector ▾ | Active | 4.670 | 4.730 | 2.620 | 21.634 |
| [B] | Utilities | VSNT | Versant Corporation | Utility ▾ | Active | 12.600 | 12.950 | 48.071 | 42.679 |
| [B] | Services | NET | NET Services de Comunication S.A. | Utility ▾ | Active | 11.300 | 11.180 | 38.978 | 38.978 |

Play by Play

*Objective is to fill your draft board with all sector, utility and bench player/stocks.*

Figure 10

| | | | | | | | | | | | | |
|---|---|---|---|---|---|---|---|---|---|---|---|---|
| GTF | 1.00 | △ | 0/09 | 9.89% | 9.3K | ANDS | 4.63 | △ | 0.38 | 8.94% | 143.1K | AXR | 114.25 | △ | 5.65 | 5.20% | 180.6K |
| CTE | 2.20 | △ | 0.15 | 7.32% | 35.0K | VNLS | 2.39 | △ | 0.17 | 7.66% | 100 | CAL | 45.09 | △ | 2.21 | 5.15% | 6.47K |
| TQ | 0.94 | △ | 0.0599 | 6.81% | 4.0K | GSOL | 17.67 | △ | 1.20 | 7.32% | 423.12K | CQBJWS | 2.20 | △ | 0.0999 | 4.76% | 7.1K |

Research and Analysis

Stocks
Sector

[Industrial Goods ▼]  [_____] [Find Stock]

1102

View League Leaders

[Filter]  1104

| Sector | Symbol | Stock | Position | Action | Prev. Close | Fri. Close | 3w | 6w | Watch |
|---|---|---|---|---|---|---|---|---|---|
| Industrial Goods | KOP | Koppers Holdings Inc. | Sector ▼ | [Buy] | 19.910 | 19.910 | 3.593 | -12.216 | [Watch] |
| Industrial Goods | KRSL | Koppers Holdings Inc. | Sector ▼ | [Buy] | 9.240 | 9.240 | 2.128 | 3.404 | [Watch] |
| Industrial Goods | KUB | Kubota Corp. | Sector ▼ | [Buy] | 45.020 | 45.020 | 1.251 | -5.925 | [Watch] |
| Industrial Goods | KMT | Kennametal Inc. | Sector ▼ | [Buy] | 62.550 | 62.550 | 0.018 | -0.953 | [Watch] |
| Industrial Goods | KFI | K&F Industries Holdings Inc. | Sector ▼ | [Buy] | 18.470 | 18.470 | -0.108 | 14.034 | [Watch] |
| Industrial Goods | KDN | Kayden Corp. | Sector ▼ | [Buy] | 39.530 | 39.530 | -2.191 | 3.501 | [Watch] |
| Industrial Goods | KAI | Kadant Inc. | Sector ▼ | [Buy] | 27.450 | 27.450 | -4.080 | 15.868 | [Watch] |
| Industrial Goods | KBH | KB Home | Sector ▼ | [Buy] | 43.830 | 43.830 | -7.361 | -0.295 | [Watch] |

1. Click the dropdown sector menu box
2. Find and highlight the stock
3. Click "Filter" button

Figure 11

Stocks
Sector

[ f ] [Find Stock] — 1302, 1304

[All Sectors ▼]   [Filter]   View League Leaders

| Sector | Symbol | Stock | Position | Action | Prev. Close | Fri. Close | 3W | 6W | Watch |
|---|---|---|---|---|---|---|---|---|---|
| Financial | FRG | Fronteer Development Group, Inc. | Sector ▼ | [Buy] | 6.080 | 6.080 | 20.167 | 28.333 | [Watch] |
| Financial | FFH | Fairfax Financial Holdings Ltd. | Sector ▼ | [Buy] | 168.000 | 158.000 | 16.484 | 14.768 | [Watch] |
| Consumer Goods | FORD | Forward Industries, Inc. | Sector ▼ | [Buy] | 5.400 | 5.400 | 14.458 | 4.016 | [Watch] |
| Financial | FMCO | FMS Financial Corporation | Sector ▼ | [Buy] | 30.450 | 30.450 | 13.116 | 13.116 | [Watch] |
| Services | DAVE | Famous Dave's of America, Inc. | Sector ▼ | [Buy] | 15.430 | 15.430 | 10.491 | 13.921 | [Watch] |
| Technology (1) | FLSW | M-Systems Flash Disk Pioneers Ltd. | Sector ▼ | [Buy] | 46.670 | 46.670 | 10.478 | 25.776 | [Watch] |
| Consumer Goods | FDP | Fresh Deli Monca Products Inc. | Sector ▼ | [Buy] | 15.870 | 15.870 | 9.163 | 6.278 | [Watch] |
| Services | FCFS | First Cash Financial Services, Inc. | Sector ▼ | [Buy] | 21.790 | 21.790 | 9.132 | 4.890 | [Watch] |
| Services | FRN | Friendly Ice Cream Corp. | Sector ▼ | [Buy] | 10.500 | 10.500 | 9.130 | 15.870 | [Watch] |
| Consumer Goods | F | Ford Motor Company | Sector ▼ | [Buy] | 8.030 | 8.030 | 8.780 | 21.893 | [Watch] |
| Services | FDO | Family Dollar Stores Inc. | Sector ▼ | [Buy] | 29.810 | 29.810 | 7.925 | 15.926 | [Watch] |
| Technology (1) | FCSE | FOCUS Enhancements, Inc. | Sector ▼ | [Buy] | 1.650 | 1.650 | 7.407 | 0.928 | [Watch] |

*How to search for a stock:*

*1. Enter the stock symbol, or*

*2. Enter the first letter of the stock symbol*

*Figure 13*

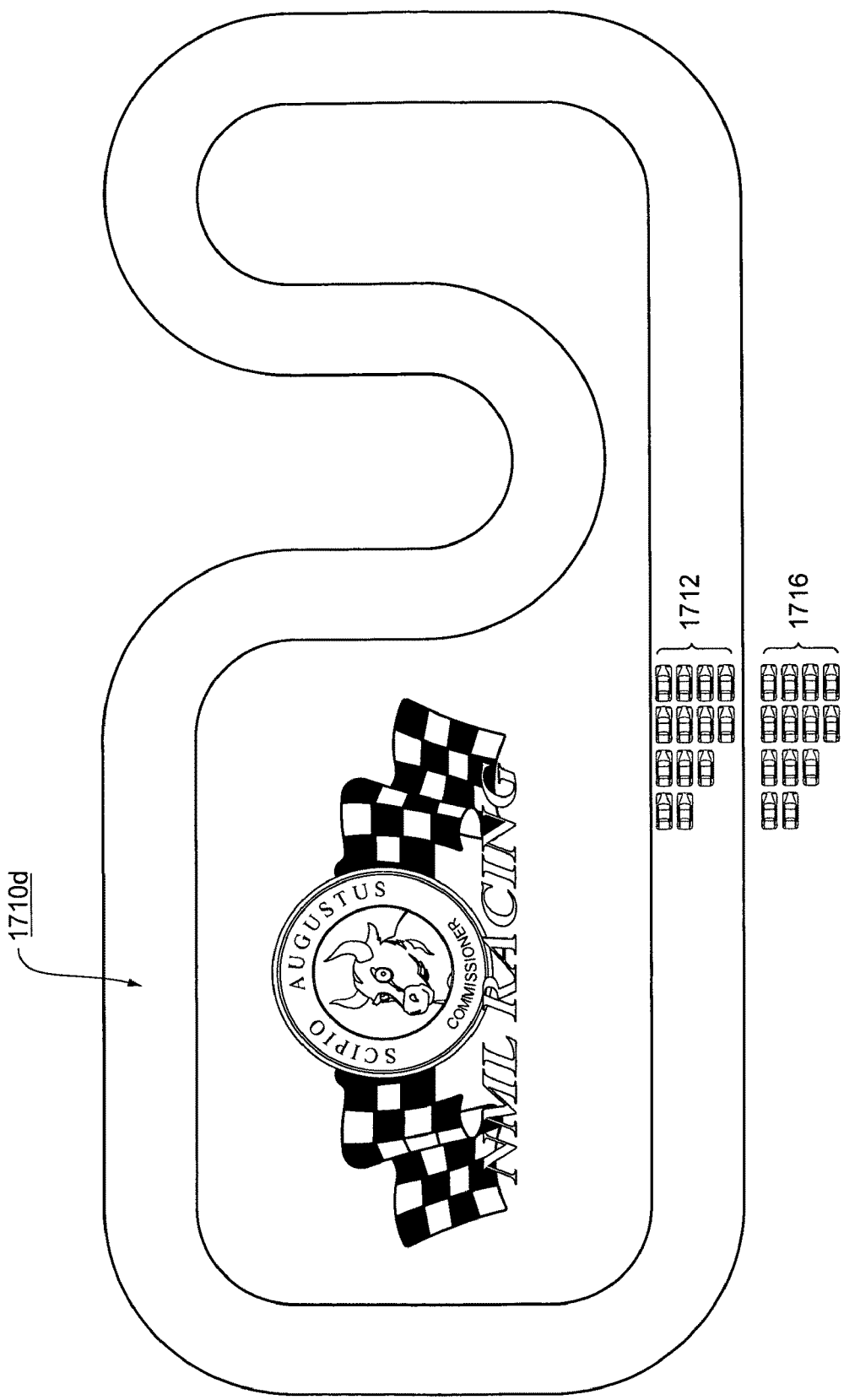

Figure 19

| League | My Team | Schedules | Stocks | Research & Analysis |

Research and Analysis

Username: _____ Password: _____ [Login]

Stock Screener  Jan 31 4:36 PM EST
Preset Screens | Help

Search Options

| Del | Criteria | Condition | Values | |
|---|---|---|---|---|
| x | Exchange | = | NASDAQ | v |
| x | Sector | = | Technology | v |
| x | Share Price | between | 0 | v / 10 v |
| x | Market Capitalization | between | 0 | v / 250m v |
| x | Earnings Per Share | between | 1 | v / 10 v |
| x | 5 Yr Annual Income Growth Rate | between | 0 | v / 100 v |
| x | Institutional Holdings | between | 0 | v / 100 v |

[Add Search Filter]  [Run Screen]

Research and Analysis
Access to professional broker tools

SYSTEMS AND/OR METHODS FOR STOCK PORTFOLIO BASED COMPETITIVE SIMULATIONS

CROSS-REFERENCE TO RELATED APPLICATION

This application claims the benefit of U.S. Application Ser. No. 60/890,427 filed on Feb. 16, 2007, the entire contents of which are hereby incorporated herein by reference.

TECHNICAL FIELD

The exemplary embodiments described herein relate to systems and/or methods for competitive simulations and, more particularly, to systems and/or methods in which users build stock portfolios that compete against each other, with the performance of each user's stock portfolio being based on one or more stock market related metrics (e.g., price per share, market capitalization, volume of trade, etc.). A user's portfolio may be formed and/or reformed so as to comply with certain predefined criteria (e.g., company traded on a particular exchange, company belonging to a particular market sector, etc.).

BACKGROUND AND SUMMARY

Every year, people spend countless hours and dollars trying to figure out how to "beat the market." There is no set definition of "beating the market," but generally it refers to the process of trying to understand and explain the structure, function, and overall performance of the stock market and other investment tools and then using this savvy to achieve a subjectively good return on investment. Yet, despite hours of study, consultations with experts, the development of complicated models, attendance at lectures, and study of investment books, the stock market remains a poorly understood— if not completely misunderstood—phenomenon. The thrill of "winning" in the market often is offset by the pain of "losing" in the market. The recent history of market "booms" and "busts," references to various bubbles bursting, and the collective memory of the Depression, for example, each accentuate these fears.

Thus, there is an inherent impediment to full participation in, and understanding of, the market, especially when the stakes quite literally can be high. Indeed, even beyond relatively risk-averse individuals, many people are turned off simply because of the inherent risk associated with the market. These people never experience the fun of "playing the game" and fail to gain investment intuition that comes through experience. They also miss out on the opportunity to compete with others, therefore missing out on the ability to use their own micro-strategies and behaviors to help influence the macro-performance of the market.

Thus, it will be appreciated that there exists a need for overcoming one or more of the above-described and/or other drawbacks. It also will be appreciated that there is a need for allowing individuals to experience the thrill of, and/or learn about, the stock market in a fun, easy, and risk-free environment.

Fantasy sports games have gained popularity over the last few years. In brief, fantasy sports games enable individuals to create fantasy teams and compete against the fantasy teams of others. Each fantasy team may comprise players drafted from a pool, with or without regard to the real-world teams. Once created, the fantasy teams generally "score points" based on the performance of the players comprising the teams. As such, fantasy sports games enable players to create fantasy teams that compete in a fantasy scenario in which real sports-related statistics are translated into fantasy sports-based performance of the fantasy teams.

According to certain exemplary embodiments, a competitive simulation between players is provided. Each player may have a team/portfolio comprising a plurality of individual players/stocks. The team/portfolio performance may be based on at least one stock-market related metric of each individual player/stock. The performance of each team/portfolio may be depicted using sports-related imagery. As such, certain example embodiments may provide a fantasy-like scenario in which fun and familiar sports-related imagery is used to represent more complex stock-market related statistics. The representation of the more complex stock-market related statistics via the sports-related imagery may be provided at varying levels of complexity and/or detail such that, for example, the dynamics of the stock market are brought to life in an interesting, engaging, and understandable manner. In these and/or other ways, it is therefore possible to advantageously allow individuals to experience the thrill of, and/or learn about, the stock market in a fun, easy, and risk-free environment.

In certain exemplary embodiments, in a computer-mediated network environment, a method of conducting a competitive simulation between a plurality of users, each said user having an associated team is provided. A sport to be simulated is selected as a part of the competitive simulation. At least two teams are built, with each said team comprising a plurality of player stocks and with each said team being built in dependence on the selected sport. Games to be played over a predetermined game time by two of said teams are defined. While a game is being played, a stock market related metric for each player stock of each team playing in the game is tracked. The stock market related metrics for each team playing in the game are compared over one or more predefined periods of the game time. Points are awarded to each team playing in the game based on the comparison. A winner is determined based on the total number of points awarded to each team over the entire game time.

In certain exemplary embodiments, there is provided a computer readable storage medium tangibly storing instructions for performing a competitive simulation based on a sport, the instructions being executable so as to cause a computer in a network environment to perform method steps. A plurality of positions on a team are filled via a draft, with the team comprising a plurality of player stocks, and with each said player stock being assigned a position on the team in dependence on a characteristic of the player stock. A starting lineup of drafted players on the team is selected, with the starting lineup being selected so that each position of the team is filled with a player stock assigned to that respective position. A stock market related metric is tracked for each player stock in the starting lineup during a predefined game scenario of the competitive simulation, with the game scenario occurring over a predetermined time period. Team performance is simulated in dependence on the tracked stock market related metrics of the team during the game scenario.

In certain exemplary embodiments, in a computer-mediated network environment, a method of conducting a competitive simulation between a plurality of users, each said user having an associated team is provided. A sport to be simulated is selected as a part of the competitive simulation. At least two teams are built, with each said team comprising a plurality of player stocks and with each said team being built in dependence on the selected sport. Built teams are divided into one or more leagues, with each said league having one sport associated therewith. Games to be played over a predetermined game time by two of said teams are defined for each said league. While a game is being played, a stock market related metric for each player stock of each team playing in the game is tracked. Prices of the player stocks for each team playing in the game are compared over one or more predefined periods of the game time. Points are awarded to each team playing in the game based on the comparison. A winner is determined based on the total number of points awarded to each team over the entire game time. The player stocks are displayed on a field arranged according to the selected sport and also animated in dependence on the comparison.

In certain exemplary implementations, the sport is at least one of football, basketball, baseball, racing, soccer, and ice hockey. The predetermined game time may be a five-day period from Monday through Friday, and/or each predefined period of the game time may correspond to one day in certain exemplary implementations. A team may be rewarded with a bonus situation (e.g., a corner-kick, a penalty kick, a free throw attempt, a power play, etc.) randomly or in dependence on a predetermined event in certain exemplary implementations. In certain exemplary implementations, a team may be penalized (e.g., with a technical foul, a player stock being placed in a penalty box, an ejection of a player, etc.) randomly or in dependence on a predetermined event.

The exemplary embodiments described herein may be implemented as any suitable combination of programmed logic circuitry (e.g., hardware, software, firmware, and/or the like). Also, the exemplary embodiments described herein may be tangibly stored as instructions on a computer-readable storage medium.

These aspects and exemplary embodiments described herein may be used separately and/or applied in various combinations to achieve yet further embodiments of this invention.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 7 is an illustrative screen for viewing a team or portfolio, in accordance with an exemplary embodiment;

FIG. 9 is an illustrative screen for selecting stocks, in accordance with an exemplary embodiment;

FIG. 10 is an illustrative screen for specifying the status of the stock, in accordance with an exemplary embodiment;

FIG. 11 is an illustrative screen for filtering stocks by the sector to which they belong, in accordance with an exemplary embodiment;

FIG. 13 is an illustrative screen for searching for stocks, in accordance with an exemplary embodiment;

FIG. 17E is an illustrative screen for visualizing the performance of a team or portfolio using a racing-like sports scenario, in accordance with an exemplary embodiment;

FIG. 19 is an illustrative screen showing various research and analysis tools, in accordance with an exemplary embodiment;

DETAILED DESCRIPTION

The exemplary embodiments described herein relate to systems and/or methods for competitive simulations and, more particularly, to systems and/or methods in which users build stock portfolios that compete against each other, with the performance of each user's stock portfolio being based on one or more stock market related metrics (e.g., price per share, market capitalization, volume of trade, etc.). A user's portfolio may be formed and/or reformed so as to comply with certain predefined criteria. Such predefined criteria may include, for example, the requirement to select a certain number of stocks from one or more particular exchanges (e.g., X stocks from NASDAQ, Y stocks from AMEX, etc.), to completely fill a team with a set number of players (e.g., 11 players for a football team, 9 players for a baseball team, etc.), to select companies belonging to a particular market sector (e.g., to play the role of a particular player on a particular team, etc. The performance of each team/portfolio may be depicted using sports-related imagery (e.g., as teams on a football field, a basketball court, around a baseball diamond, etc.).

1. Introduction

Figure 1:
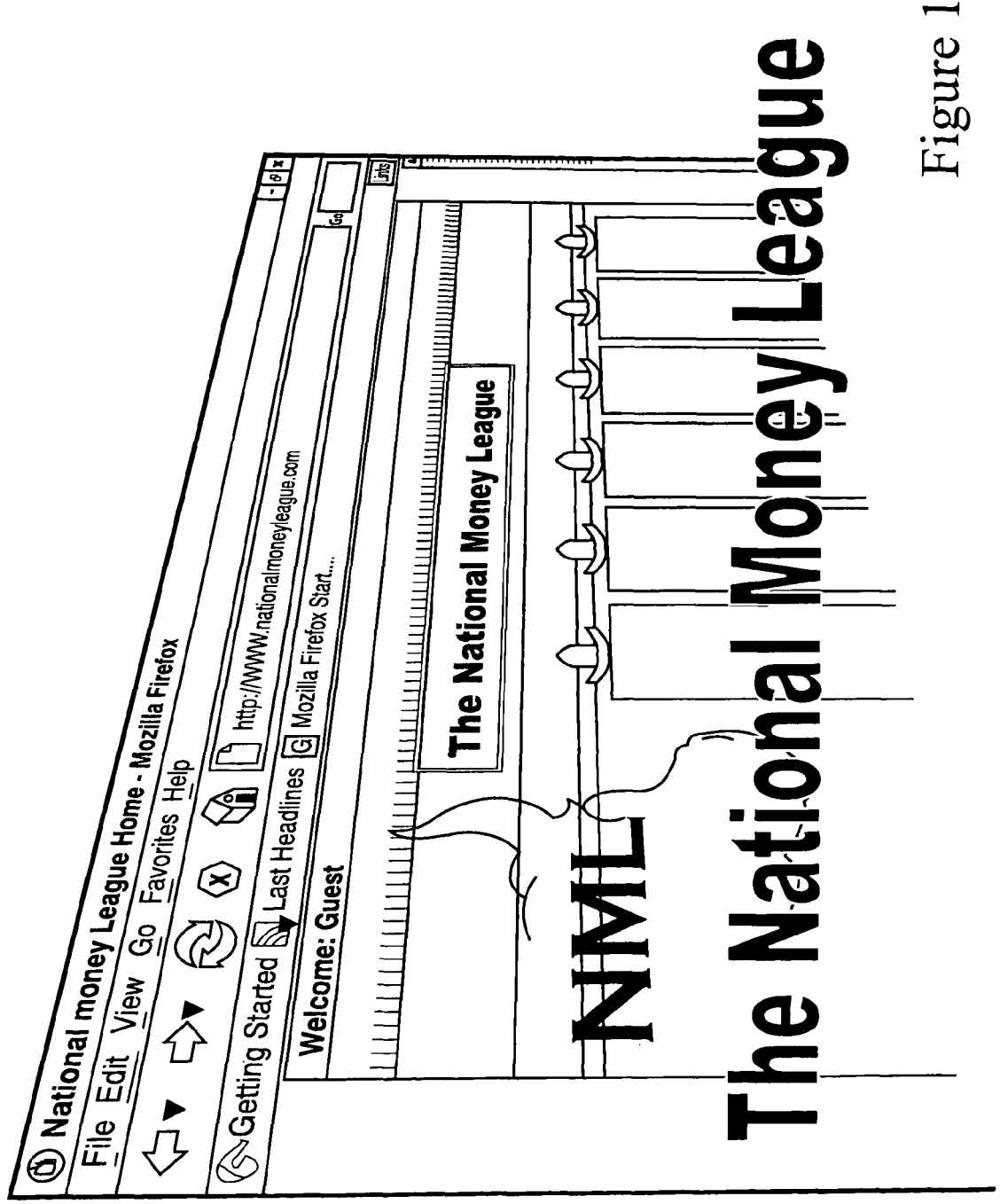
FIG. 1 is an illustrative welcome screen for the National Money League, in accordance with an exemplary embodiment.
Figure 2:
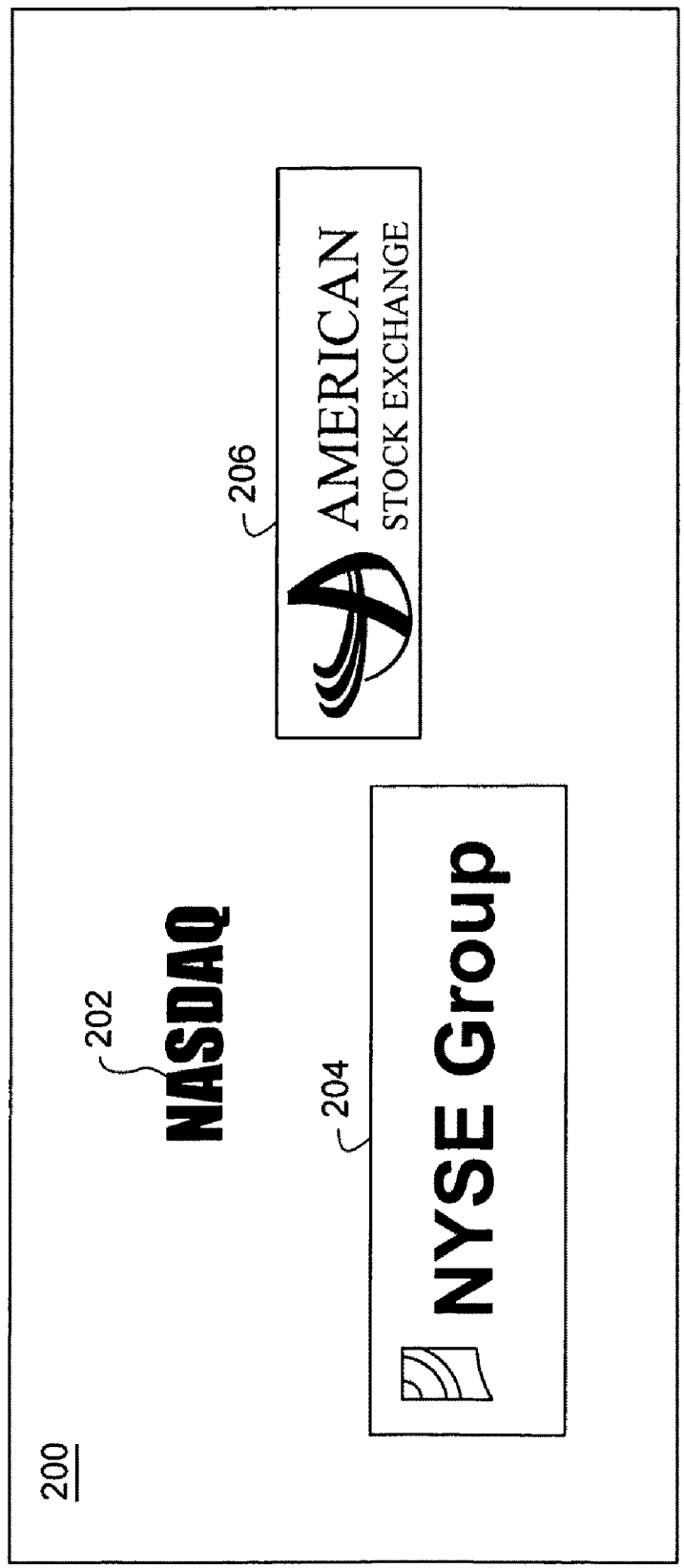
FIG. 2 shows several illustrative stock exchanges that provide stock information for the National Money League, in accordance with an exemplary embodiment.
Figure 3:
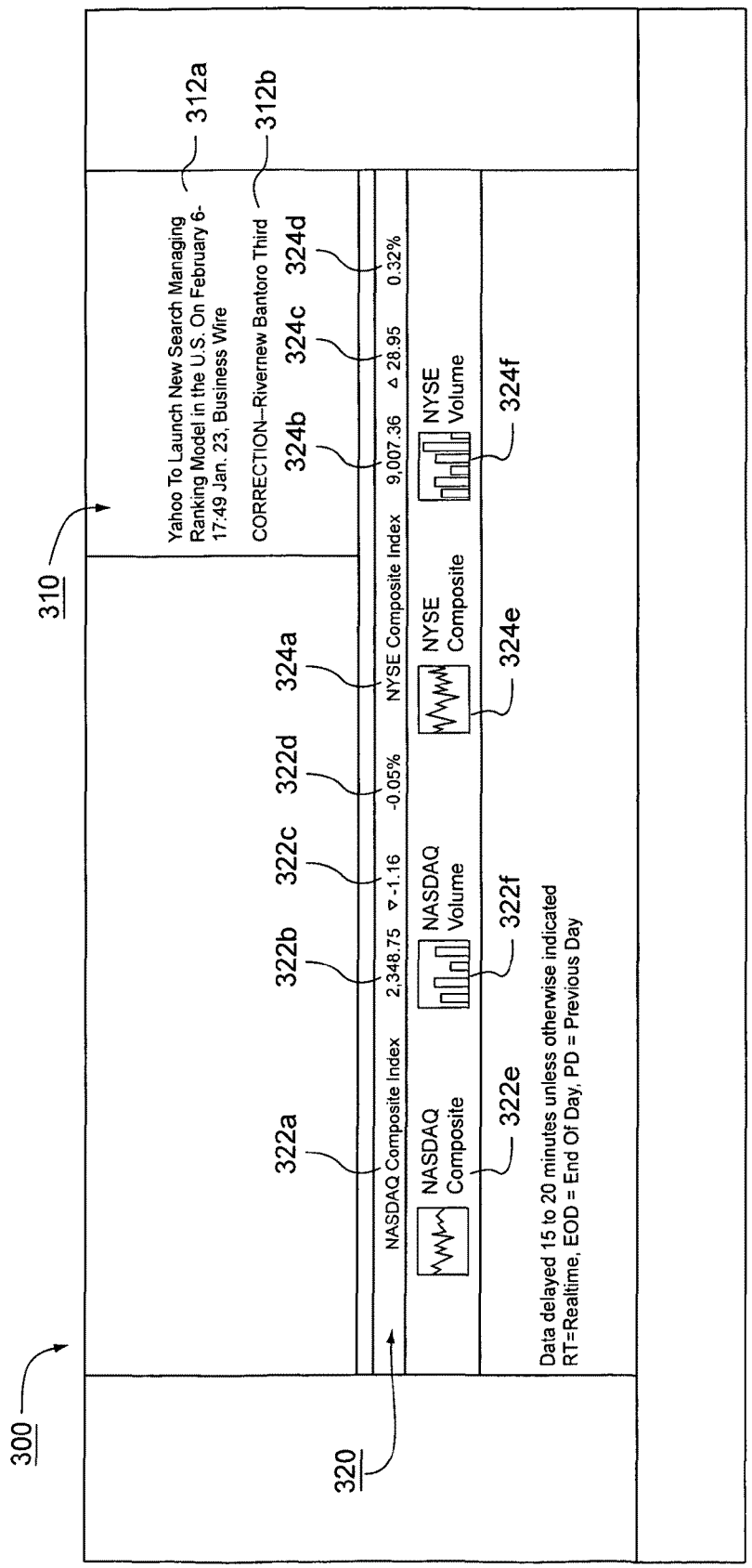
FIG. 3 is an illustrative customizable ticker, in accordance with an exemplary embodiment.

Certain exemplary embodiments relate to a simulation game called, for convenience, the National Money League (NML). In brief, the NML is a fantasy simulation game that allows individual players to compete against other players' stock portfolios or teams. The NML has the feel of Fantasy Football integrated with the stock market. FIG. 1 is an illustrative welcome screen for the National Money League, in accordance with an exemplary embodiment. Players may have at least some of the same stock-related research and information as any professional brokerage house. For example, the NML may provide real 15-20 minute delayed financial market quotes from the NASDAQ, the American Exchange, the New York Stock Exchange, etc. In particular, FIG. 2 shows several illustrative stock exchanges that provide stock information for the National Money League, in accordance with an exemplary embodiment. FIG. 2 shows the NASDAQ 202, the NYSE 204, and AMEX 206, although other markets and/or exchanges are also possible. Other news and information, along with a customizable stock ticker, also may be provided. This other news and information may include, for example, press releases, media coverage, SEC filings, market and/or stock analysis reports, and/or any other publicly available and/or custom developed content pertaining to the stocks and/or stock market as a whole. FIG. 3 is an illustrative customizable ticker, in accordance with an exemplary embodiment. The display 300 in FIG. 3 includes a headline area 310, which includes a plurality of headlines 312a-b related to monitored and/or other stocks. The custom ticker area 320 may include text and/or graphical information about a variety of different stocks, exchanges, or the like. For example, in FIG. 3, information for the NASDAQ Composite Index (identified in area 322a) includes its value 322b, its change 322b, its percent change 322d, and graphs of its composite 322e and volume 322f. Similar information may be provided for the NYSE Composite index (as identified in area 324a), including its value 324b, its change 324b, its percent change 324d, and graphs of its composite 324e and volume 324f.

The NML can be an easy way for beginners or stock market novices—including teens, young adults, students, and others—to learn how to be successful investing in stocks. More experienced investors also may participate to showcase their purported savvy, compete with their friends, coworkers, competitors, etc. To facilitate broad-based appeal, a user might choose to invite friends, colleagues, coworkers, family members, and others to play along. Groups or "leagues" within the NML may be formed, allowing for more focused, personalized, or otherwise particularized competition. Invitations may be sent by word-of-mouth or through electronic means. For example, an existing user may choose to invite one or more prospective users to join the NML through a web-based form. The existing user may provide contact information for the prospective user(s), such as, for example, phone numbers, email addresses, real addresses, etc. In certain exemplary embodiments, an email may be sent inviting prospective users to join the NML. In such a case, the email sent to the prospective user may include information identifying the existing user (e.g., name, contact information, a message, etc.). The user may click on a link embedded in the email message to begin a membership confirmation process, with such link optionally having information embedded therein such as the inviter, invitee, group name, game type selected, and/or other information to facilitate sign-up. In certain exemplary embodiments, a user may enter an automatically generated code (e.g., corresponding to some or all of the information provided above) to facilitate sign-up. The prospective user may receive such a code directly from the existing user, via email, through a text message (e.g., an SMS message), etc. Such activation or identification codes may be at least temporarily stored in a centrally accessible database in certain exemplary embodiments so as to facilitate new member sign-up in a way transparent to the existing and/or prospective user(s).

A person signing up for the NML may be charged a fee, with various forms of price discrimination being possible, for example, for students, adults, professional investors, etc. The fees collected may be used to defray costs associated with the maintenance of the overall NML (e.g., the cost of maintaining an up-to-date database of quotes, news, and the like; hosting and management fees for the overall NML; hosting and management fees for particular leagues; etc.), to reward "league winners" at the end of a "season" (for example, the person achieving the greatest amount of money, the greatest return on investment, the most heat-to-head wins, etc. over a predetermined time period, such as, for example, a day, week, month, etc.), etc.

Through participation in the NML, users ranging from beginners to advanced users and even power brokers may be able to improve in their knowledge of the stock market and finances in general.

2. Signup

Figure 4:
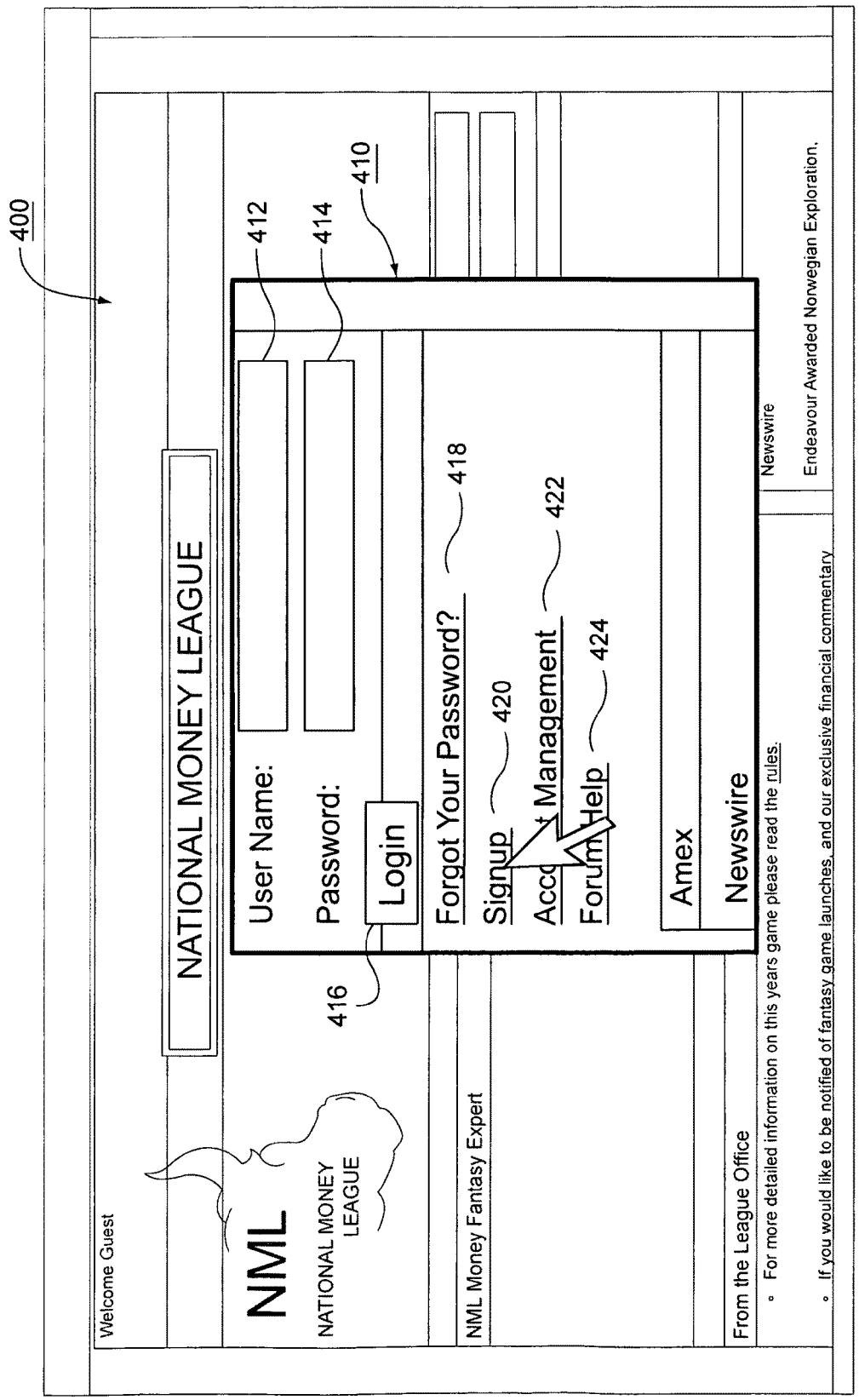
FIG. 4 is an illustrative login screen, in accordance with an exemplary embodiment.

To signup, when monthly membership fees are due, the user may click on a "Signup" button from the home page and select the type of account subscription (e.g., Monthly Adult, Monthly Student, etc.). FIG. 4 is an illustrative login screen, in accordance with an exemplary embodiment. In FIG. 4, the login screen 410 is displayed over the main screen 400. The login screen 410 includes areas for a user to input a username (412) and password (414). Pressing the login button 416 verifies the information input into the areas 412 and 414 against a membership table in a database (e.g., as described in greater detail below). Other links may be provided to the login screen 410, for example, to enable a registered user to retrieve a forgotten password (418), to allow a new user to signup (420), to provide account management features to a registered user (422), to provide help (424), etc.

Subsequent to the login selection screen, a "Register and Checkout" section may be provided to allow the user to input contact information (e.g., name, email address, home address, phone number, nickname, etc.) and payment information (e.g., payment method such as credit card number and expiration date, billing cycle information such as one time payment or per month billing, etc.). As a part of the registration and/or signup process, in certain exemplary embodiments the user may also be prompted to join one or more particular leagues. The user may receive an email confirmation after registration and payment is completed and/or verified. The registration email may be automatically generated by the NML and sent to an email address specified by the user. The registration email may include confirmation information including, for example, the real name of the user, the user's online "nickname," the league the user has joined, confirmation of any billing information, After registration, a user may create a new league and/or join an existing league.

2.1 Creating a New League

Figure 5:
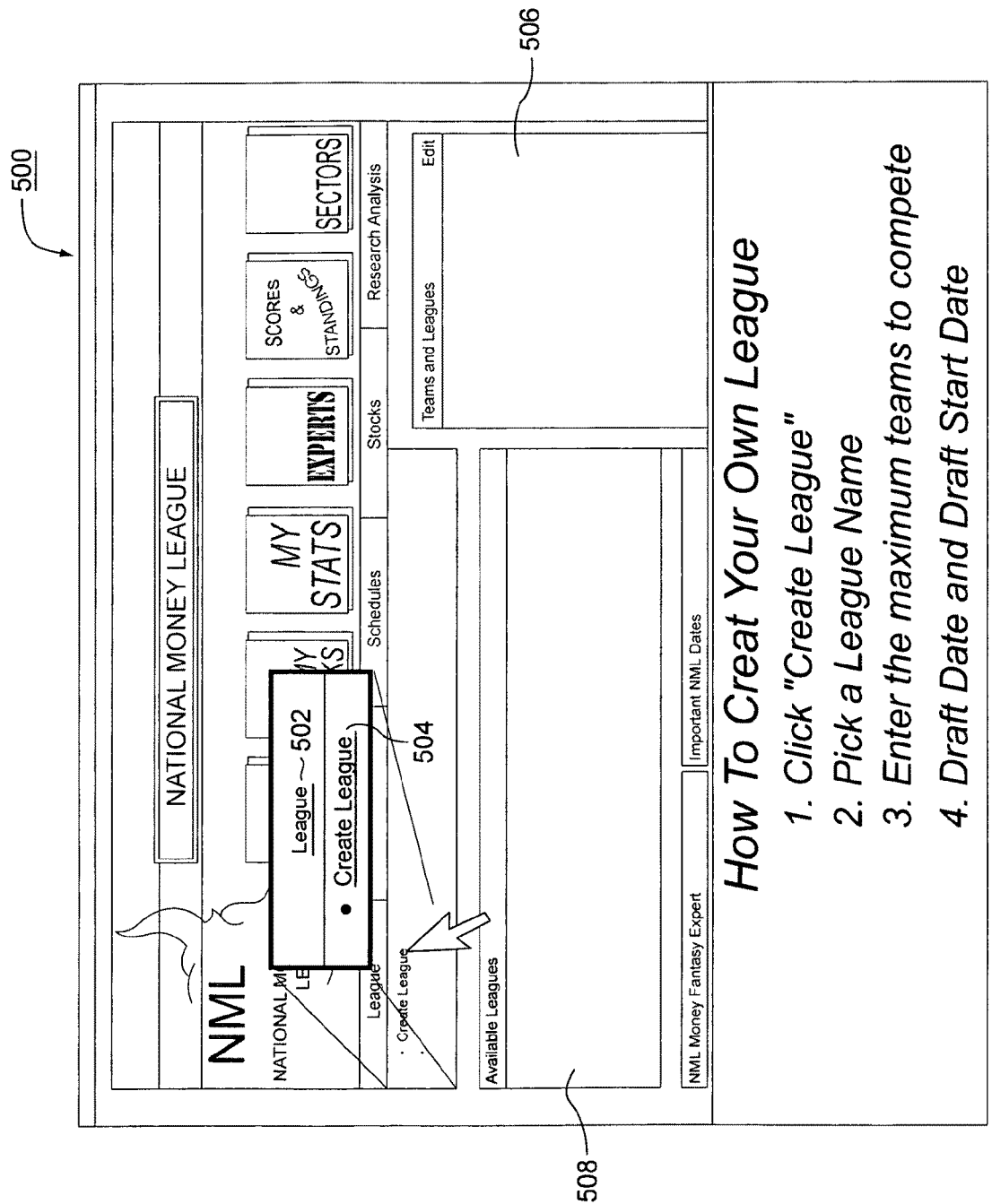
FIG. 5 is an illustrative screen for creating a league, in accordance with an exemplary embodiment.

To "Create" a new league, the user may click on a link at the top of the home page, and a "Create League" page is displayed. From this page, the user may enter information and/or specify certain options for the league, such as, for example, League Name, Maximum Teams allowed to compete, Draft Date, Draft Start Time, etc. The league name may be a unique or non-unique identifier of as association of competitors (e.g., "Company X League," "New York Power Brokers League," "Newbies," etc.). A person setting up a league may limit the number of people allowed to compete in the league by specifying the maximum teams allowed to compete, for example, to ensure that only friends join, that others are not invited, etc. In certain exemplary embodiments, there may be a "maximum" maximum number of teams allowed to compete. That is, the NML itself may limit the number of teams allowed to compete in a league. The draft date and draft start time indicate to the league members when they will be expected to participate in the "drafting" of player stocks, or when such player stocks will be drafted for them. Such information may be at least temporarily stored in a centrally accessible database, as will be described in greater detail below. FIG. 5 is an illustrative screen for creating a league, in accordance with an exemplary embodiment. The display 500 in FIG. 5 shows the options under league tab 502, which includes an option for creating a league (504). Also displayed under this tab are a list of all teams and leagues 506, as well as a list of all available leagues 508.

2.2 Joining an Existing League

To join an existing league, the user may search through the leagues listed in the "Available Leagues" section. If there is available space in the league, the user may click a "Join" button to join the corresponding league. Some restrictions may be applied to leagues. For example, some leagues may be by invitation only, etc. To facilitate joining a league, a league list may be generated based on information stored in a centrally accessible database. The league list may be sorted or filtered based on various criteria, such as, for example, game type (e.g., football, basketball, baseball, hockey, soccer, racing, etc.), audience or user type (e.g., day-traders, investment clubs, companies, amateurs, etc.), alphabetically by name, and/or the like.

After joining a league, a user may be shown a corresponding League ID, League Member ID#, and League Name. At this point, the user may input an individual Team Name. The user also may designate whether the game should automatically select the best team/portfolio available (e.g., by checking an Auto Draft Team checkbox), or whether the user would like to control the draft process individually.

The date and time of the draft may be displayed on the home page for the user. The exemplary drafting processes are described below.

3. The Draft

After a user registers a team with The National Money League, the user may prepare for a "draft" from among player stocks to join the team/portfolio. The user may use the home page to find the league for which the user is drafting a team and click on a Draft button at the scheduled listed date and time.

A user may draft a team/portfolio using one of several techniques, or a combination therebetween. For example, users may choose to automatically draft a team, draft manually, etc.

3.1 Exemplary Techniques for Auto-Drafting a Team/Portfolio

Figure 6:
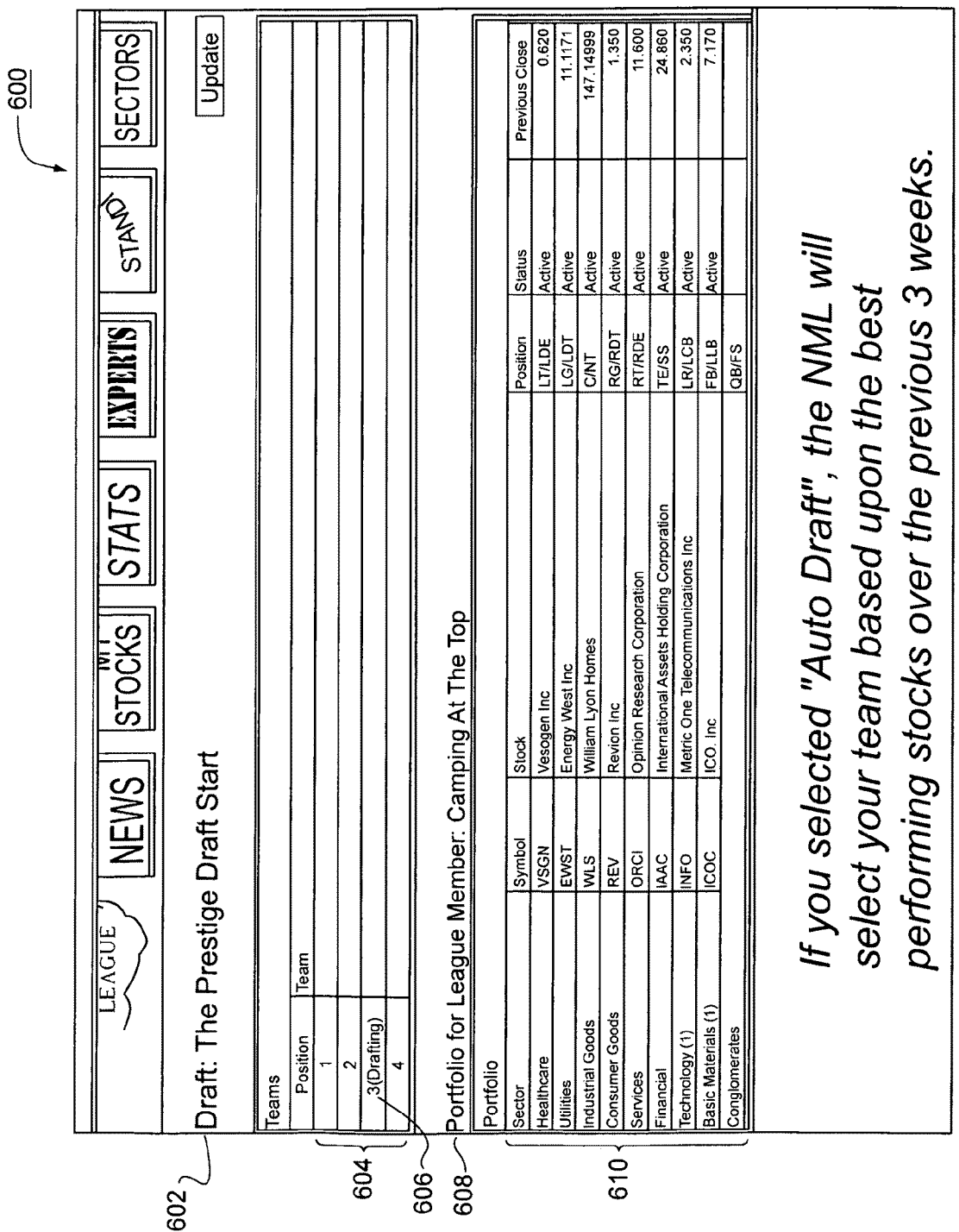
FIG. 6 is an illustrative screen for performing an automatic draft, in accordance with an exemplary embodiment.

A team/portfolio may be created through a draft. When the "Auto Draft Team" option is selected, the team/portfolio may be selected automatically, without direct user controller. For example, a user may have a team/portfolio selected automatically during the draft based on a specific characteristic/metric of the team/portfolio. One specific characteristic may be the performance of the stock over an arbitrary time period (e.g., the stock's change in price over the last 3 weeks, etc.). In such a case, the NML may automatically select the best available performing stock according to the characteristic. FIG. 6 is an illustrative screen for performing an automatic draft, in accordance with an exemplary embodiment. In the display 600 of FIG. 6, the team name 602 (in this example, "The Prestige") is displayed. A list of teams and their respective draft positions 604 is displayed, along with an indicator 606 of the currently drafting team. Towards the bottom of the display 600 is the currently selecting team's portfolio 610, which lists the drafted stocks and their symbols, along with their sectors, positions, status, and previous close.

"Semi-automatic" drafting also may be setup such that, for example, at least some user preference information is entered before the draft. For example, a user may rank order all stocks or a large number of stocks. In such a case, the NML may take the highest ranked stock available at each of the player's turns. In another example, the user may program the NML to select certain positions or sector stocks first, second, third, etc., so as to try to obtain good "point guards" first, then good "centers" second, good "shooting guards" third, etc. In still another example, a user may program the NML to favor certain types of stocks above others when performing the automatic selection (e.g., favor large value stocks, growth stocks, high market capitalization stocks, technology stocks, particular industry stocks, etc.).

As noted above, a user need not be "present" (e.g., logged on and/or monitoring, etc.) during the actual draft when the "Auto Draft Team" option is selected. After the draft, the user may view the entire team/portfolio. Additionally, a user also may view the draft live, even though the selections are made for the user automatically. FIG. 7 is an illustrative screen for viewing a team or portfolio, in accordance with an exemplary embodiment. The display 700 of FIG. 7 allows the stocks 704 in the portfolio to be sorted in dependence on statistics aggregated over a predefined time period (702), such as, for example, over the current day, the last week, month, or season. The lineup also may be edited through this screen, e.g., via the dropdown list in the middle of the display 700.

3.2 Exemplary Techniques for Manually Drafting a Team/Portfolio

Figure 8:
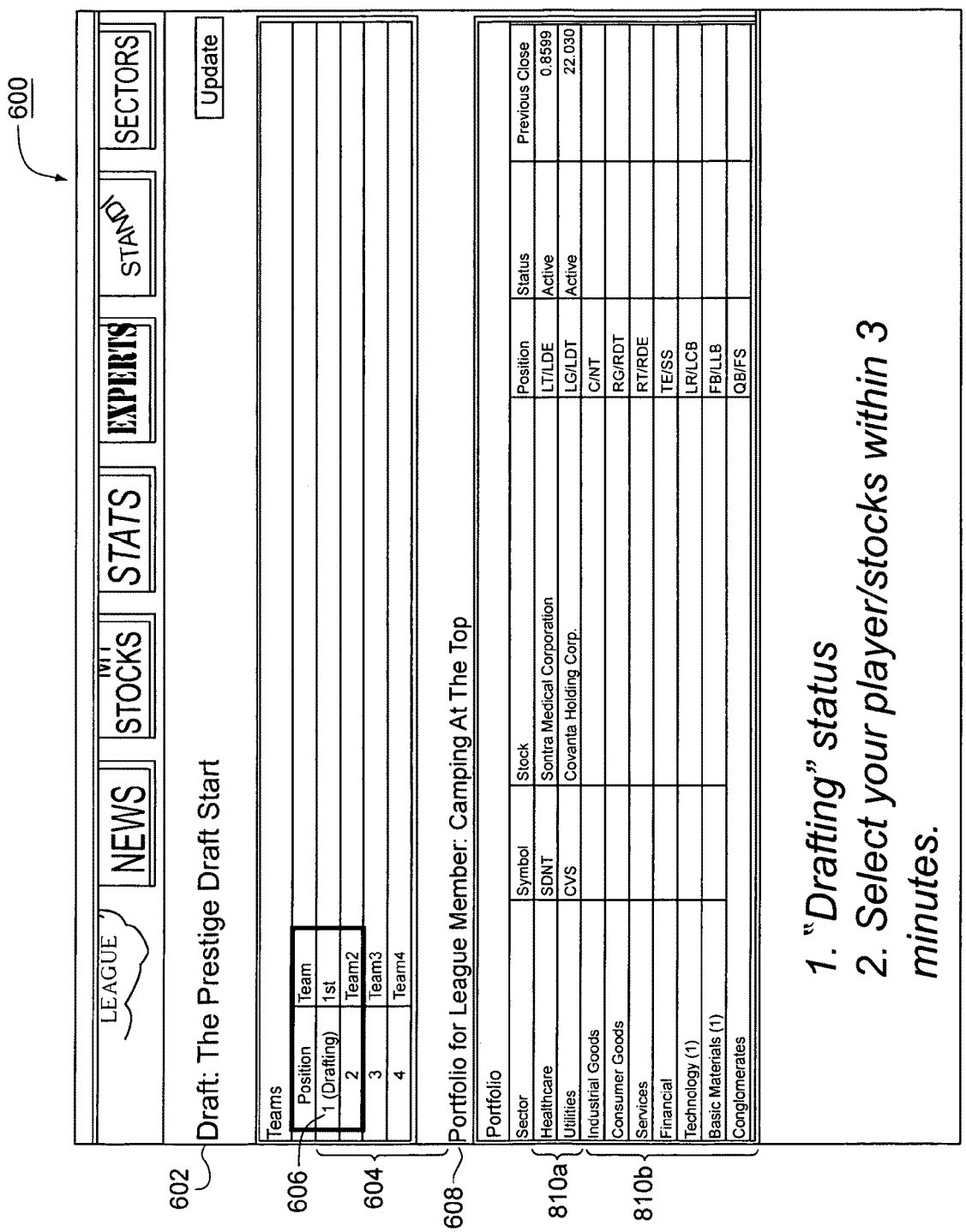
FIG. 8 is an illustrative screen for performing a "live" draft, in accordance with an exemplary embodiment.

Apart from the Auto-Draft, a user also may manually draft a team/portfolio. When the draft starts, the user may be able to select a stock by looking at the draft board. When, the draft board indicates that it is the user's turn to draft, the user may to select the player/stock within a predetermined time period (e.g., within 3 minutes). In certain exemplary embodiments, once a selection is made, the user may be required to confirm that the selected stock should actually be drafted. In certain exemplary embodiments, waiting longer than 3 minutes may result in a player/stock being drafted automatically for the user. For example, if a stock has been selected but not confirmed, the selected stock may be drafted. In another example, if no stock has been selected, a stock may be drafted based on an automatic or semi-automatic draft rule as described in greater detail above. The next team/portfolio on the list will select next. Once the draft reaches the bottom of the list, the drafting will move back through the list until each team/ portfolio has been filled. In this way, a draft may proceed as usual, with each user in the league taking turns drafting players/stocks for the user's own team/portfolio. FIG. 8 is an illustrative screen for performing a "live" draft, in accordance with an exemplary embodiment. FIG. 8 is similar to FIG. 6, although it will be appreciated that the portfolio is partially filled with stocks 810*a* already selected, while positions to be filled 810*b* remain vacant pending the results of the rest of the draft.

3.2.1 Exemplary Techniques for Selecting a Player/Stock

A user may select a stock by scrolling down a page listing all available stocks. The stocks may be sorted (or resorted) based on a category. For example, the stocks may be sorted by top percentage gaining stocks over the previous 3 weeks, alphabetically by name or by symbol, etc. Stock information such as, for example, a listing of the available stocks, the performance of the stocks over a time period, etc., may be stored in a database managed by the NML, and/or may be available by communicating with a third-party service that provides similar information, e.g., via an API. The user may draft the stock by pressing a "BUY" button. Through the selection process, the user may fill the user's draft board with sufficient sector player/stocks, utility player/stocks, and bench player/stocks to "field" a team. FIG. 9 is an illustrative screen 900 for selecting stocks, in accordance with an exemplary embodiment, and FIG. 10 is an illustrative screen for specifying the status of the stock, in accordance with an exemplary embodiment. The status may be specified via a dropdown, selecting from a list 1000, which may include options for setting the particular stock as a sector stock, utility stock, or bench stock.

3.2.2 Viewing/Filtering Particular Stocks

Stocks may be filtered according to one or more categories. For example, stocks may be filtered to fill a particular sector by clicking a dropdown and selecting a "Filter" button, selecting a sector from a list, etc. From a resulting display, a user may find and highlight the stock. FIG. 11 is an illustrative screen for filtering stocks by the sector to which they belong, in accordance with an exemplary embodiment. By way of example and without limitation, stocks may be classified into some or all of the following sectors: Healthcare, Utilities, Industrial Goods, Consumer Goods, Services, Financial, Technology, Basic Materials, Conglomerates, etc. In FIG. 11, a user may select a sector from the sector dropdown list 1102 and then press the filter button 1104 to update the list.

Figure 12:
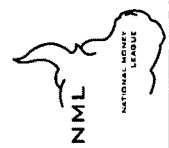
FIG. 12 is an illustrative screen for sorting stocks by one or more statistics associated with the stocks, in accordance with an exemplary embodiment.

Stocks also may be filtered by, for example, performance. For example, the "top stocks" based on the previous 6 weeks, 3 weeks, previous Friday close, previous day's close, etc., may be displayed. FIG. 12 is an illustrative screen for sorting stocks by one or more statistics associated with the stocks, in accordance with an exemplary embodiment. The time period may be specified (1202) by selecting from, for example, the current day, week, month, or over the whole season.

3.2.4 Exemplary Techniques for Searching Player/Stocks

To find a player/stock, a user may enter the stock symbol in the "Search" box above the list and click the "Enter" button. If the stock symbol is not known to the user, the user may enter the first letter or first few letters to search among stock symbols and/or names. Then, matching player/stocks may appear in the list below. FIG. 13 is an illustrative screen for searching for stocks, in accordance with an exemplary embodiment. In the FIG. 13 display, a user may enter all or a part of the stock symbol or name in the box 1302 and press the "Find Stock" button 1304 to trigger a search that updates the list at the bottom of the display. An exact match may be highlighted in certain exemplary embodiments.

Figure 14:
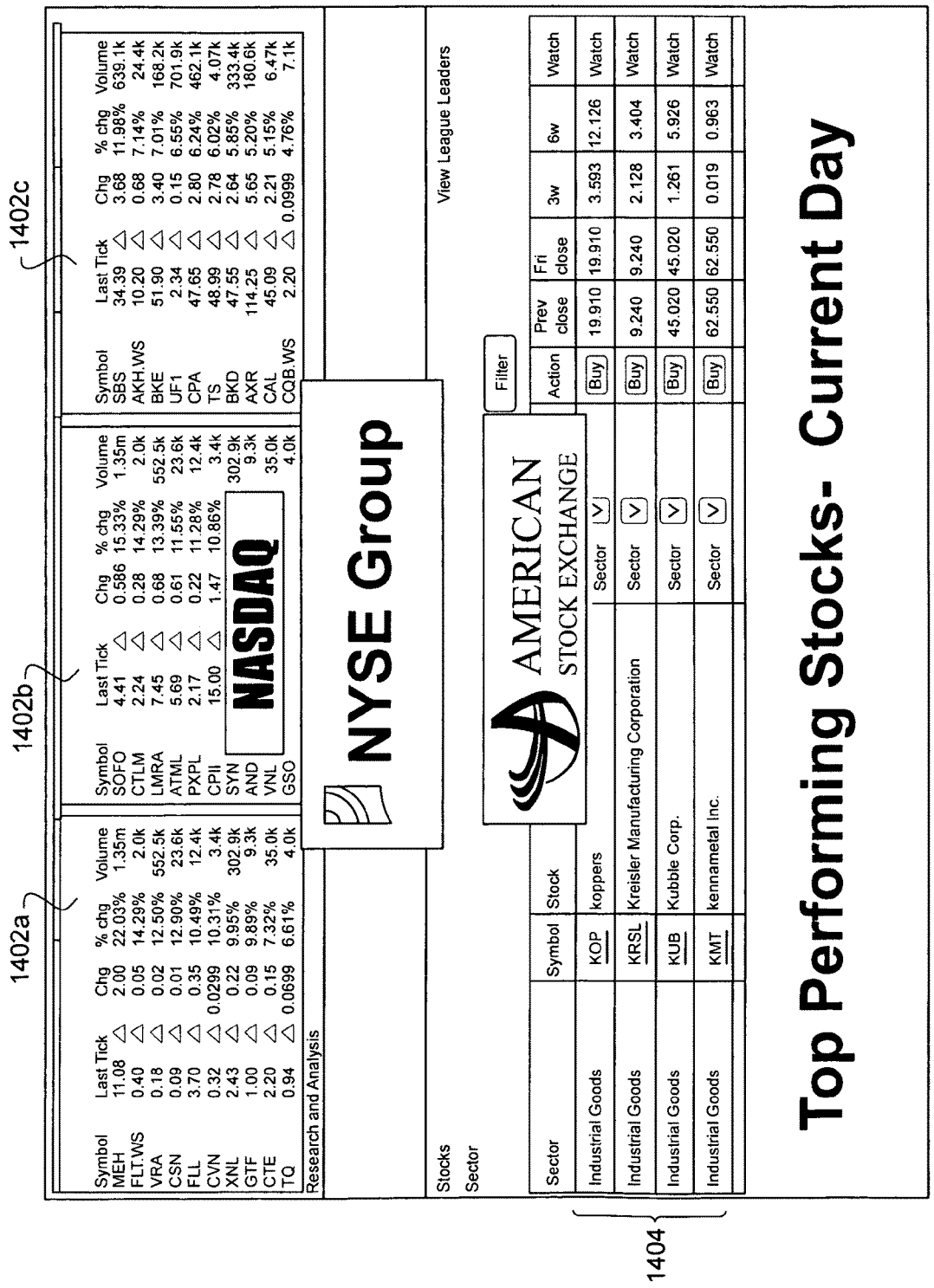
FIG. 14 is an illustrative screen for displaying the top-performing stocks for a given day, in accordance with an exemplary embodiment.
Figure 15:
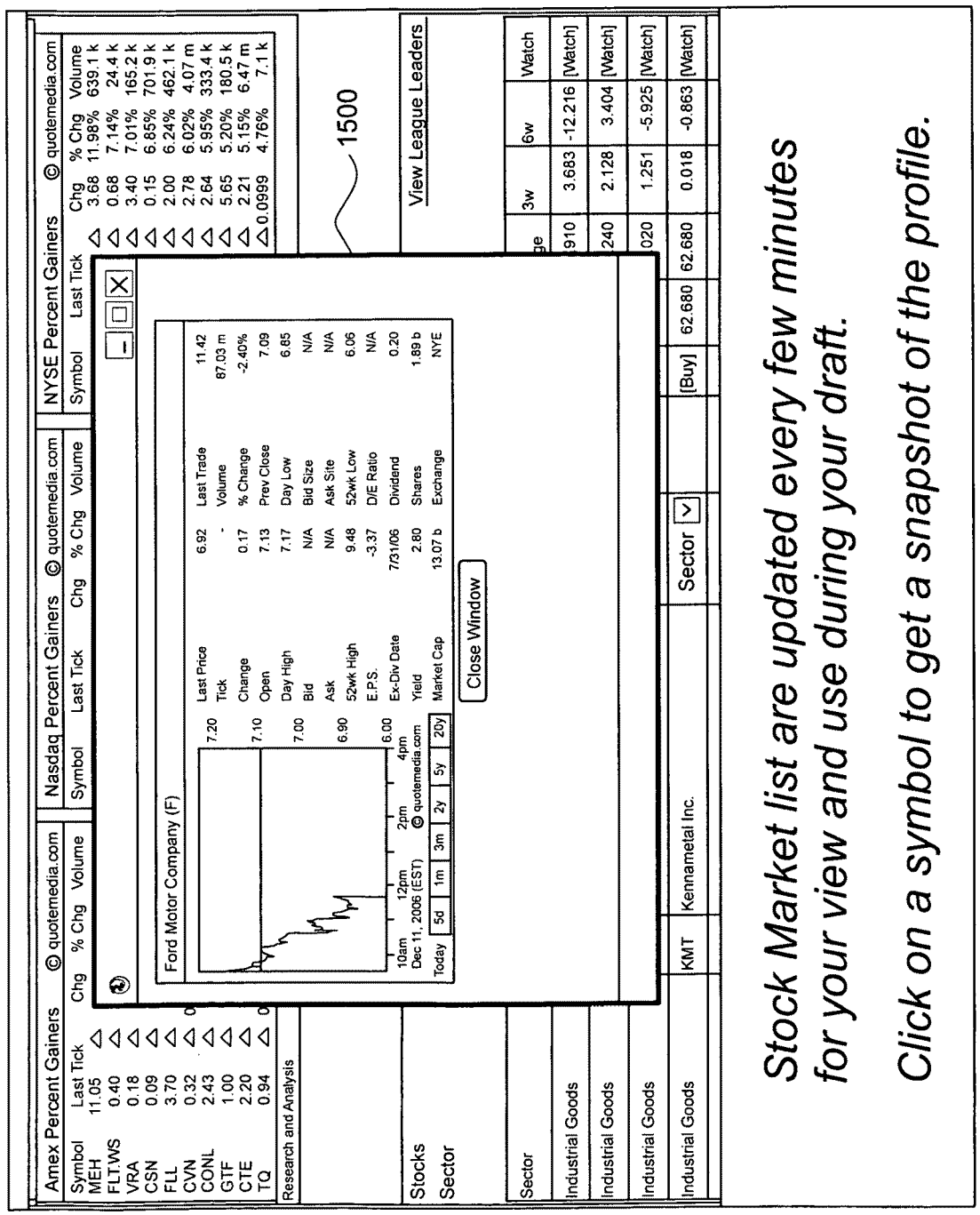
FIG. 15 is an illustrative screen displaying detailed profile information for a selected stock, in accordance with an exemplary embodiment.

3.2.5 NASDAQ, the New York Stock Exchange, and the American Exchange Top Performing Stocks—CURRENT DAY Under a user's draft board, a list of the current top performing stocks for each of the three markets may be displayed. This list may be updated every few minutes to view during the draft. FIG. 14 is an illustrative screen for displaying the top-performing stocks for a given day, in accordance with an exemplary embodiment. In particular, the top performing stocks on all three markets are shown in display areas 1402*a-c*, along with statistics thereof. The particular player's top performing stocks also are listed (1404). To receive more information on a stock, a user may select (e.g., click on) the symbol to obtain a quick snapshot of the stock's profile. FIG. 15 is an illustrative screen displaying detailed profile information 1500 for a selected stock, in accordance with an exemplary embodiment. The user also may draft a stock from this screen. Some stocks may not be readily and/or immediately available to the NML. For example, a company making an Initial Public Offering (IPO)—e.g., being new to the stock market—may not be available to the NML within the first few days that it is listed on the market. In other cases, stock information may be provided on a slightly delayed (e.g., 15-20 minute delay) to non-brokers. It also may be possible in certain exemplary embodiments to pay a premium to receive real-time or substantially real-time stock information.

4. Exemplary Techniques for Managing a Team/Portfolio

Once a team/portfolio has been drafted, a user can manage the team for competition. For example, the appropriate league may be selected (e.g., clicked on) from the home page, and then the specific team may be selected (e.g., clicked on). All of the stocks/players selected from the draft may appear on this "Portfolio/Team Edit Lineup" page. The lineup may be specified and/or edited for a given period of competition (e.g., for a week), for example, via the "Line Up" dropdown (which may list all active or available stocks that may participate in the competition) on the top-left side of the page. In certain exemplary embodiments, the competition may proceed using a football analogy and, accordingly, it may be possible to "start" 11 active stocks/players as "sector" positions for each week, with two additional "utility" players specified (e.g., indicating which players actually will compete). In certain other exemplary embodiments, the competition may proceed using a basketball analogy and, accordingly, it may be possible to "start" 5 active stocks/players as "sector" positions for each week, with one additional "utility" player. Of course, the present invention is not limited to any particular kind of sports-related analogy. Other team- and/or non-team-based sports may be used in connection with certain exemplary embodiments. For example, the sports-related analogy may be as simple as two teams playing tug-of-war. It also will be appreciated that the number of active players and/or utility players may be dependent on the type of sports-related analogy implemented, and that the present invention is not limited to any particular numbers.

4.1 Sector Stocks/Players

In certain exemplary embodiments, the stocks/players selected as sector starters must fit that particular sector, and these will be the active starters for the week. A dropdown menu may be used to place the stock/player in the appropriate position. For example, a user may not be able to select a "Utility" stock/player to compete in the "Industrial Goods" sector. In other words, in certain exemplary embodiments, a user must select a "Utility" stock/player in that sector, and a user must select an "Industrial Goods" stock in the "Industrial Goods" sector and so forth. Of course, it will be appreciated that the present invention is not limited to this requirement, nor is the present invention limited to these particular sectors. At the bottom of the page, a user may click "Update Positions" to activate the changes. To choose another or future week, a user may select the "Line Up" dropdown at the top-left side of the page and adjust the team accordingly. The following table provides an illustrative sector to stock position mapping, and also identifies illustrative skills of the sector stock players. It will be appreciated that this mapping is provided by way of example and without limitation.

| Sector | NML Position | Skills |
| --- | --- | --- |
| Healthcare | Left Tackle/Defensive End (LT/DE) | The essential trenches stock |
| Utilities | Left Guard/Left Defensive Tackle (LG/LDT) | Without Utilities we could not have our systems work |
| Industrial Goods | Center/Nose Tackle (C/NT) | Industrial Goods are the catalyst of our team |
| Consumer Goods | Right Guard/Right Defensive Tackle (RG/RDT) | Another essential trenches stock that we cannot live without |
| Services | Right Tackle/Right Defensive End (RT/RDE) | Services give us the foundation for all products |
| Financial | Tight End/Strong Safety (TE/SS) | Financial stocks are essential for blocking and assured short yardage gain |
| Technology (1) | Left Receiver/Left Cornerback (LR/LCB) | Completing the technology-long pass can give your team big gains |
| Basic Materials (1) | Full Back/Left Line Backer (FB/RLB) | Basic Materials give your team the running game necessary to control your team |
| Conglomerates | Quarterback/Free Safety (QB/FS) | Conglomerates represent a diversified player who lead through their multiple skills |
| Basic Materials (2) | Running Back/Right Line Backer (RB/RLB) | Basic Materials give your team the running game necessary to control your team |
| Technology (2) | Right Receiver/Right Cornerback (RR/RCB) | Completing the technology-long pass can give your team big gains |
| Utility | Any Sector | Take your pick from any sector |
| Utility | Any Sector | Take your pick from any sector |

4.2 Utility Players

The utility stocks/players are active players that may come from any sector, also as starters. The dropdown may be used to place the stock/player in the appropriate position. At the bottom of the page, the "Update Positions" button may be selected to activate changes. As above, to choose another or future week, a user may select the "Line Up" dropdown at the top-left side of the page and adjust the team accordingly.

4.3 Bench Players

The bench players are not active starters for the given week, at least not until a user activates them as starters or utility stock/players. A balance of various sector stocks/players on may be kept on a bench to replace starting/utility stocks/players based on improvements/poor performance over time. At the bottom of the page, the "Update Positions" button may be selected to activate changes. To choose another or future week, a user may select the "Line Up" dropdown at the top-left side of the page and adjust the team accordingly. It will be appreciated that in addition to or in place of bench players, there may be players in the dugout or bullpen for a baseball-type game, on the sidelines for a football or soccer game, on an inactive or injured reserve list, etc. In certain exemplary embodiments, these players may be moved into play, e.g., depending on the rules of the game on which the sports-based analogy is being played (e.g., no rolling substitutions, substitutions only during stoppages of play, etc.), or according to other rules more particular to the NML (e.g., a predetermined number of substitutions per day, per player, per team, etc.).

4.4 Sell Stock/Buy Stock 4.4.1 Sell Stock

In certain exemplary embodiments, a user may be required to first sell old stocks/players before adding new players. This can be accomplished by clicking on the "Sell Stock" link at the top of the page. The user may locate and designate the stock/player to be sold, and the "Sell" button may be activated to complete the sale. When a stock is sold, a database may be updated, e.g., to indicate that a player stock is no longer on a user's team, that the player stock is available to others, etc. The user may or may not be allowed to drop below a certain number of players, e.g., a number of players required to play a game.

4.4.2 Buy Stock

The "Buy Stock" link at the top of the page may be used to purchase a new stock for a user's portfolio/team. At the top of the "Buy Stock" page, a user may be able to look at all of the top stocks sorted according to a predetermined criteria. For example, the stocks may be sorted based on the percentage of increase over the previous three weeks. The stocks also may be filtered according to some other or additional categories (e.g., the top closing stocks according to the previous day's close, the previous Friday's close, and 6-week close, etc.) by clicking on an appropriate link or forming a suitable query.

A user also may select stock/players from one particular sector or all sectors by clicking on the dropdown at the top of the page.

Once a stock is located, a user may designate the position to be filled in the portfolio. For example, this may be the same as a position recently dropped/sold (e.g., "Sector," "Utility," or "Bench"). A user may click on the "Buy" link to the right of the desired stock.

This stock/player may be seen in the portfolio by, for example, clicking on the "My Team" link at the top of the page, then clicking on the "Line Up" dropdown and selecting the upcoming week. The stock/player purchased may be set for an appropriate position. When a stock is bought, a database may be updated, e.g., to indicate that a player stock is now on a user's team, that the player stock is no longer available to others, etc. The number of stocks on a team may be limited, e.g., by limiting a user to no more players than those that would fit on a roster at a given time. The roster may include, for example, active players, bench players, injured reserve players, farm team members, etc.

A "trade deadline" or restrictions on trades may be imposed so that teams are fixed for at least certain period of time. For example, trades between teams or "drop/adds" may not be allowed during competitions for certain players (e.g., fielded or active players), after the half-way point of the season, etc.

4.4.3 Credit and Non-Credit Based Buying and Selling Schemes

In certain exemplary embodiments, the buying and selling of player stocks may be as simple as an add/drop system. For example, a user simply may add stocks from currently available stocks when the team has open slots for new "team members." If a team is completely filled, a player stock may need to be "cut" from the team, or sold, in order to make room for a new stock to be added. Additionally, a player stock might be cut at any time. Such an add/drop system is very easy to use and may be advantageous for less sophisticated users.

In certain exemplary embodiments, the buying and selling of player stocks may be based on a credit system. For example, users may be forced to at least initially select teams based on a theoretical fixed budget (which may be specified by the NML, by the user who set up the particular league, in accordance with a user's subscription fee for use of the NML, etc.). This may be viewed as something similar to an initial salary cap. As the game is played, credits may be earned or lost, e.g., in dependence on the performance of the user's team. In certain exemplary embodiments, the credits may be awarded or subtracted based on the amount the particular individual stocks comprising a team have earned or lost during a particular interval. In certain exemplary embodiments, the salary cap may be imposed to promote equality, e.g., by restricting the amount of credits that may be spent on developing a team and also encouraging others to "buy low." In certain exemplary embodiments, a salary cap may not be in place to promote a "buy low, sell high" type system, thereby effectively rewarding those who do very well in their trades and thus with their teams.

Just as there are trade deadlines in certain sports, so too may there be trade deadlines in the NML. For example, in certain illustrative implementations, a user may be required to complete all trades before a certain date (e.g., the season start date, the mid-point of a season, etc.). In certain illustrative implementations, a user may be required, in addition or in the alternative, to complete all trades between certain hours (e.g., corresponding to times when the markets are open, to allow or restrict after-hours trading, etc.). In certain illustrative implementations, a user may not be permitted to make trades during a game.

5. Additional Features

Certain exemplary embodiments of the National Money League game may have a one or more "special features" to provide competitive advantages and/or additional information regarding their stocks and/or portfolios. It will be appreciated that the following sections are provided by way of example and without limitation.

5.1 Editable Stock Ticker

At the bottom of several pages of the NML, a stock ticker may be present. This ticker may be set up to view a user's individual players/stocks, portions of or whole portfolios/teams, potential buys/sells, etc. An "edit" button may be used to cause a window to appear to allow the user to add any stock symbol or click on the "Symbol Lookup" to find one. Among other changeable features, the direction of the ticker may be altered, for example. As noted above, this information may be slightly delayed or substantially in real-time (e.g., if a premium is paid).

Figure 16:
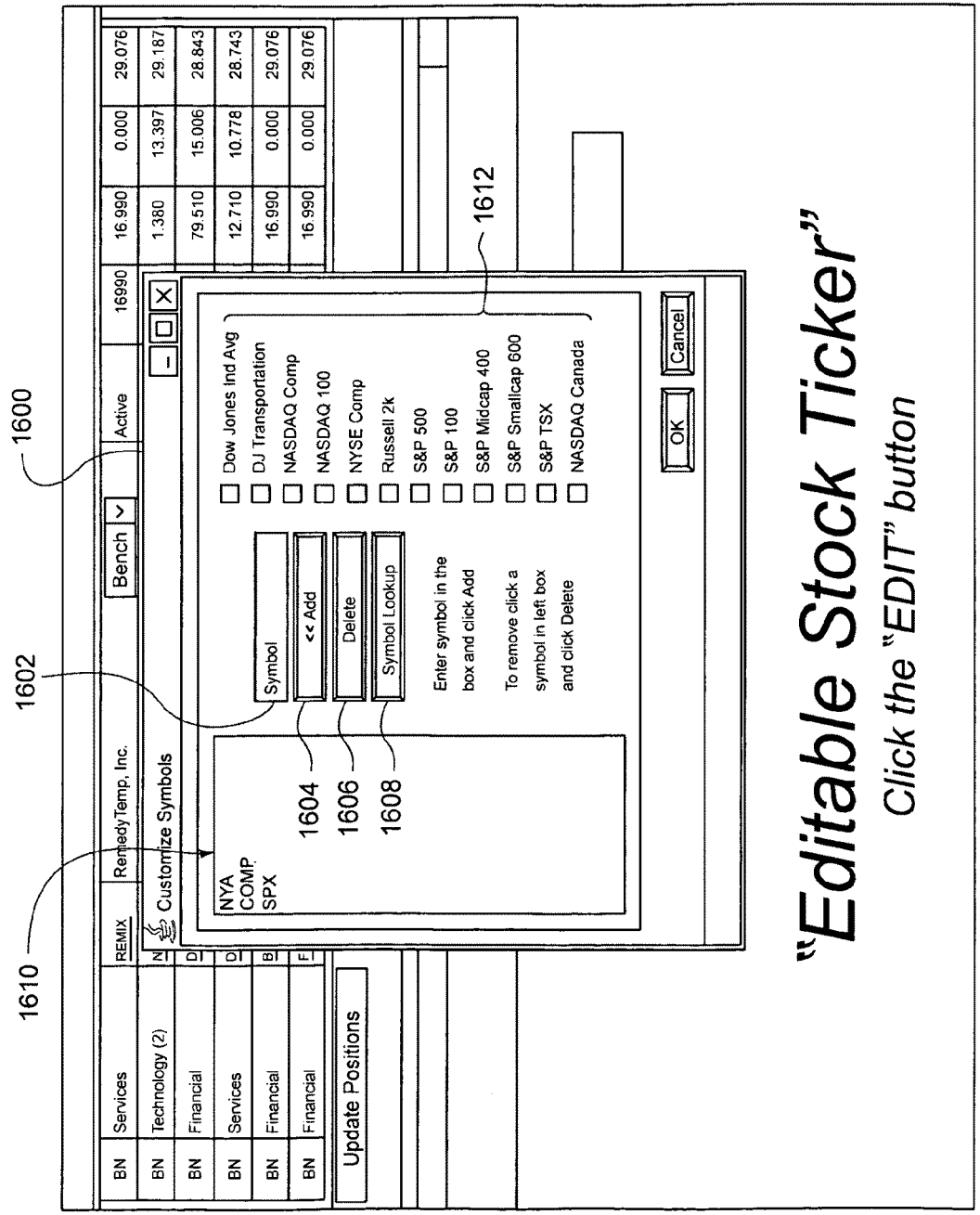
FIG. 16 is an illustrative screen for customizing an editable ticker, in accordance with an exemplary embodiment.

FIG. 16 is an illustrative screen for customizing an editable ticker, in accordance with an exemplary embodiment. In the display 1600 of FIG. 16, the user is able to enter symbols in the box 1602 and add it via add button 1604 to the list of stocks to be included in the ticker 1610. Stocks already added to the list of stocks to be included in the ticker 1610 can be removed therefrom by highlighting them and pressing the delete button 1606. A symbol may be looked up via symbol lookup button 1608. Additionally, various composites 1612 may be added to the ticker.

5.2 Play-by-Play

Figure 17A:
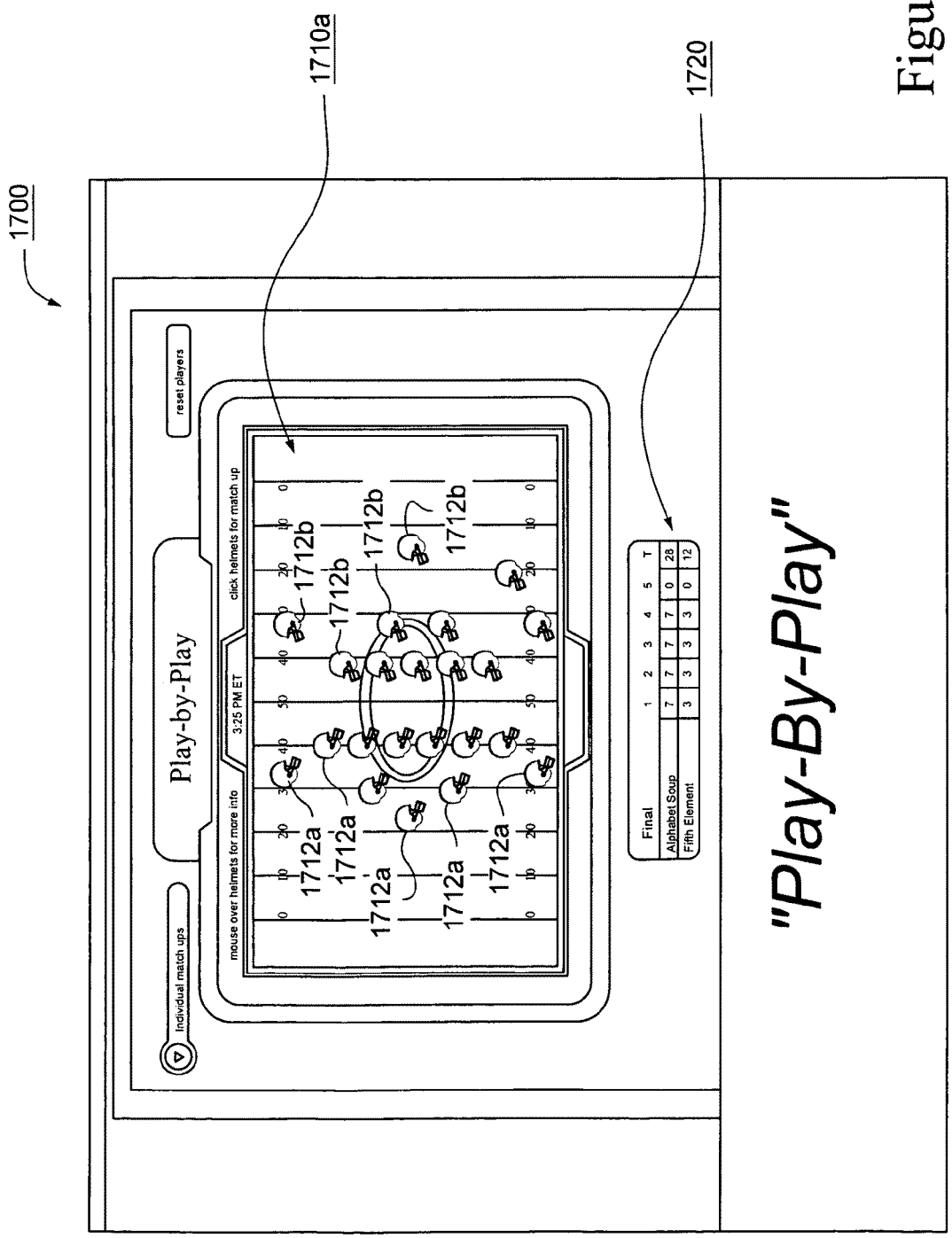
FIG. 17A is an illustrative screen for visualizing the performance of a team or portfolio using a football-like sports scenario, in accordance with an exemplary embodiment.

The NML Play-by-Play is a feature that allows the user to view nearly real time match-ups between teams. The Play-by-Play may be set up according to a sports-related analogy. The particular sport may be selected by the creator of the league, on the vote of the members of the league, etc. For example, the Play-by-Play may be set up as a football field that includes helmets matched up in real football positions. For example, industrial-type stocks may be shown as offensive/defensive linemen in a football game, centers on a basketball court, catchers on a baseball team, etc. The stock symbols may be located on the helmets, jerseys, etc., to indicate individual players/stocks. For example, FIG. 17A is an illustrative screen for visualizing the performance of a team or portfolio using a football-like sports scenario, in accordance with an exemplary embodiment. To view a match-up between stock sectors, a user may click on the helmet or use the dropdown on the top-right of the screen.

The movement—for example, in terms of type of movement and amount—of the representation of the players may be indicative of relative performance, etc. For example, the relative performance of a player/stock may be assessed and then mapped to a database of "moves" in dependence on the position in which the player/stock is playing. For example, a player/stock playing as a running back in a football game having a large gain may be shown as slashing through the defense and breaking into the secondary before being tackled. As another example, a player/stock playing as a shooting guard in a basketball game suffering a loss may be shown as committing a turnover (e.g., traveling, committing a player control foul or technical foul, etc.), getting stuffed, etc. This sort of display based on a linkage between performance (or relative performance, etc.) and position tied to a database of moves may add further entertainment and excitement, while providing understandable sports-related performance analogies to demonstrate the movement of stocks.

The plays may be viewable as the competition progresses. For example, the relative performance of the teams and/or players constituting the teams may be assessed at predetermined intervals (e.g., every 5 minutes, 30 minutes, hour, day, etc.). The relative performances of the teams and/or stocks may be compared in whole or in part. In certain exemplary embodiments, plays may be based on a one-on-one match-up of stocks. For example, two stocks representing point guards may show the better performing stock shooting and making a three-pointer, stocks representing offensive and defensive linemen may show more movement off of the line of scrimmage for the poorer performing stock, etc. In other words, centers may be matched against other centers, pitchers against hitters, etc. In certain exemplary embodiments, plays may be based on a comparison of more than one stock per team, and the performances may be "choreographed" so that a team or a portion thereof may perform better than the opposing team or a portion thereof. For example, two better performing stocks may successfully execute a pick-and-roll play, some or all of an offensive line may be moved and a quarterback may be sacked, etc. This play may continue throughout the competition and may be viewable "live" or in series so as to present a full game. The plays may shown as characters moving through the appropriate field, court, track, etc. More sophisticated animations also may be employed so as to more realistically simulate players running plays, having plays broken down or thwarted, etc. In certain exemplary embodiments, the better performing the stock, the more exciting the play may be. For example, a stock performing better than its average or better than the market average may complete a long pass, the length of the pass being based on how much the performance exceeds the average. Similarly, team performing much worse than its average may be sacked for a big loss, may commit a number of turnovers, give up a number of fast breaks, easy dunks, or backdoor cuts, etc. To increase the enjoyment of the game yet further, the animation of officials (e.g., umpires, referees, etc.) may be simulated to show that a sliding player is safe or out (e.g., when the performance of two relative stocks are close), to call a technical foul (e.g., when a company is fined or otherwise accused of wrongdoing), and/or the like.

Scoring may be awarded similarly. For example, points may be awarded by quarter, with the number of quarters being based on, for example, the number of days in a competition between two teams. In certain exemplary embodiments, a competition between two teams may last an entire work week (e.g., 5 days). Thus, there may be five quarters (even though there are two halves in college basketball and soccer, three periods in ice hockey, four quarters in football and professional basketball, a variable number of laps in racing, etc.). In certain other exemplary embodiments, the competition period may be divided so as to conform to the conventional game divisions (e.g., a first half of a week may correspond the first half of a soccer game and the second half of a week may correspond the second half of the soccer game, etc.). Points may be awarded to the team that has a higher total percent gain on a particular day and/or at the end of a competition period. Points may be awarded in a way similar to the base game being played, such that a team playing a football-type game typically earns points by the 3s or 7s, a team playing a basketball-type game typically earns points by the 1s-3s, baseball and hockey scores by the 1s, etc. In racing, points may be given out for the performance of the drivers (e.g., daily performance, laps led, etc.), the pit's performance, teammate performance, spotter performance, etc. To make the scoring seem more realistic, the points may be awarded so that at the end of a game or the entire competition, the scores are within the expected ranges of the underlying games. For example, 15-20 points may be awarded per quarter in a basketball-type game, the total number of points in a baseball-type game may be below about 9 for each team, etc. For racing, the scores may be compared to typical season-ending scores. Where the scores between teams are equal or close, shootouts, penalty kicks, overtime, and/or the like may be simulated and/or performed. For example, an extra day of competition may take place, the last hour of the competition may be weighted more heavily than others, etc.

Figure 18:
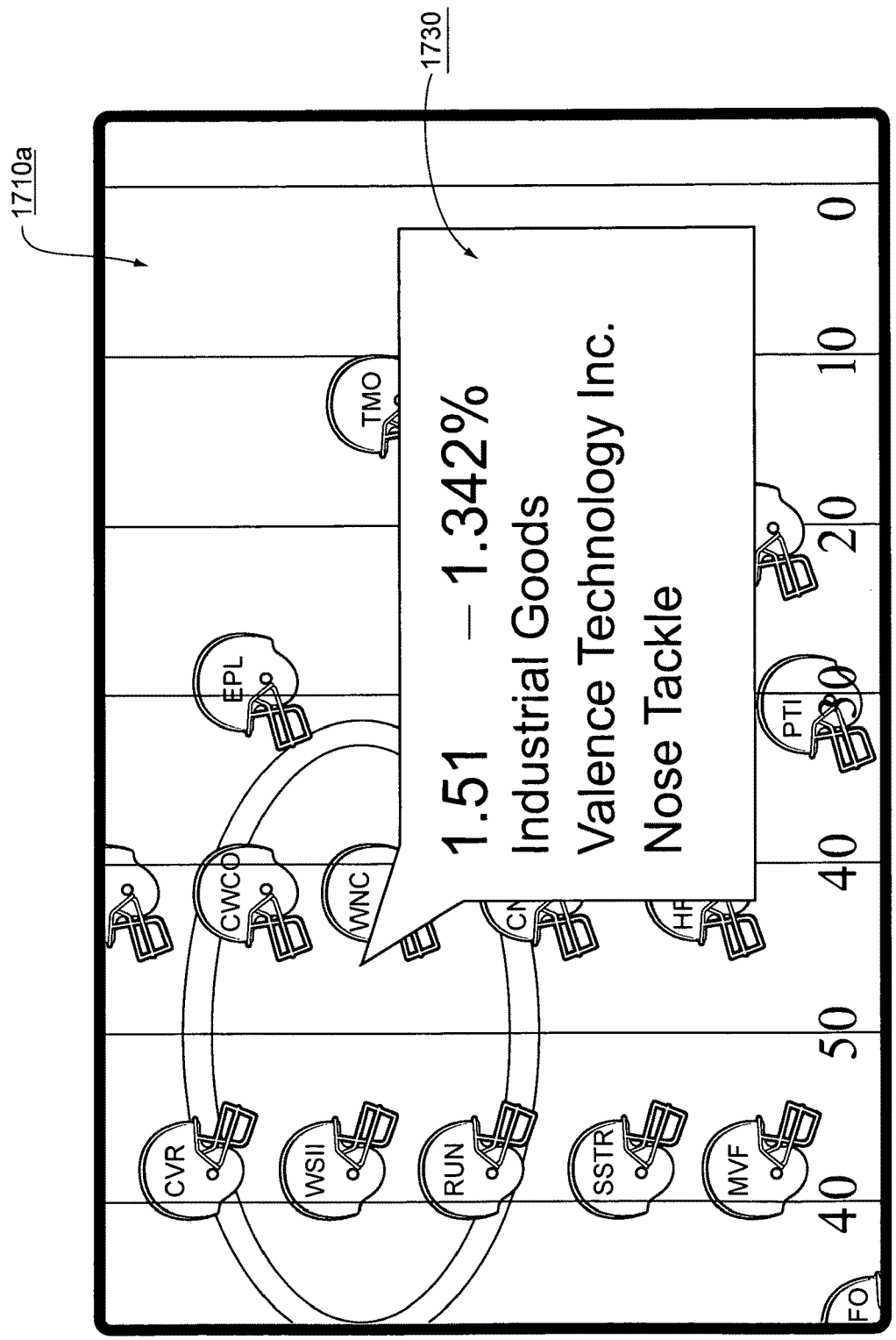
FIG. 18 is an illustrative screen showing a more detailed display of the information conveyed in FIG. 17A, in accordance with an exemplary embodiment.

By rolling over each helmet, a user may be able to obtain stock information (e.g., with a 15 to 20 minute delay), including, for example, the price, percentage of change for the day, sector, full stock name, position on the field, etc. FIG. 18 is an illustrative screen showing a more detailed display of the information conveyed in FIG. 17A, in accordance with an exemplary embodiment. In the particular example shown in FIG. 18, rolling over a helmet causes detail window 1730 to be displayed. The detail window 1730 includes the current value of the stock ($1.51), its change in percent (down 1.342%), its sector (industrial goods), its real (Valence Technology Inc.), and its position on the field (Nose Tackle). This detail window 1730 is shown over top of the field 1710a. Of course, as noted above, other sports may be used to visualize the performance of the stocks, and the present invention is not limited to any particular arrangement.

Referring to FIG. 17A in more detail, the illustrative display 1700 includes a field 1710a, which resembles a football field. On one side of the field, player stocks 1712a from a first team are lined up in a typical offensive arrangement. On the other side of the field, player stocks 1712b from a second team are lined up in a typical defensive arrangement. The player stocks 1712a and 1712b may be moved and/or animated as the game progresses, e.g., as described above. A score board 1720 is provided, showing the respective scoring for the first and second teams (e.g., "Alphabet Soup" and "Fifth Element" in this illustration) over the five "quarters" that define the particular game. As can be discerned from the scoreboard 1720, both teams have performed fairly well over the first four "quarters" of the game; however, the first team has done better than the second team over each of the "quarters." It will be appreciated that the actual performance of the player stocks is adapted so as to conform to football like scores, as noted above.

Figure 17B:
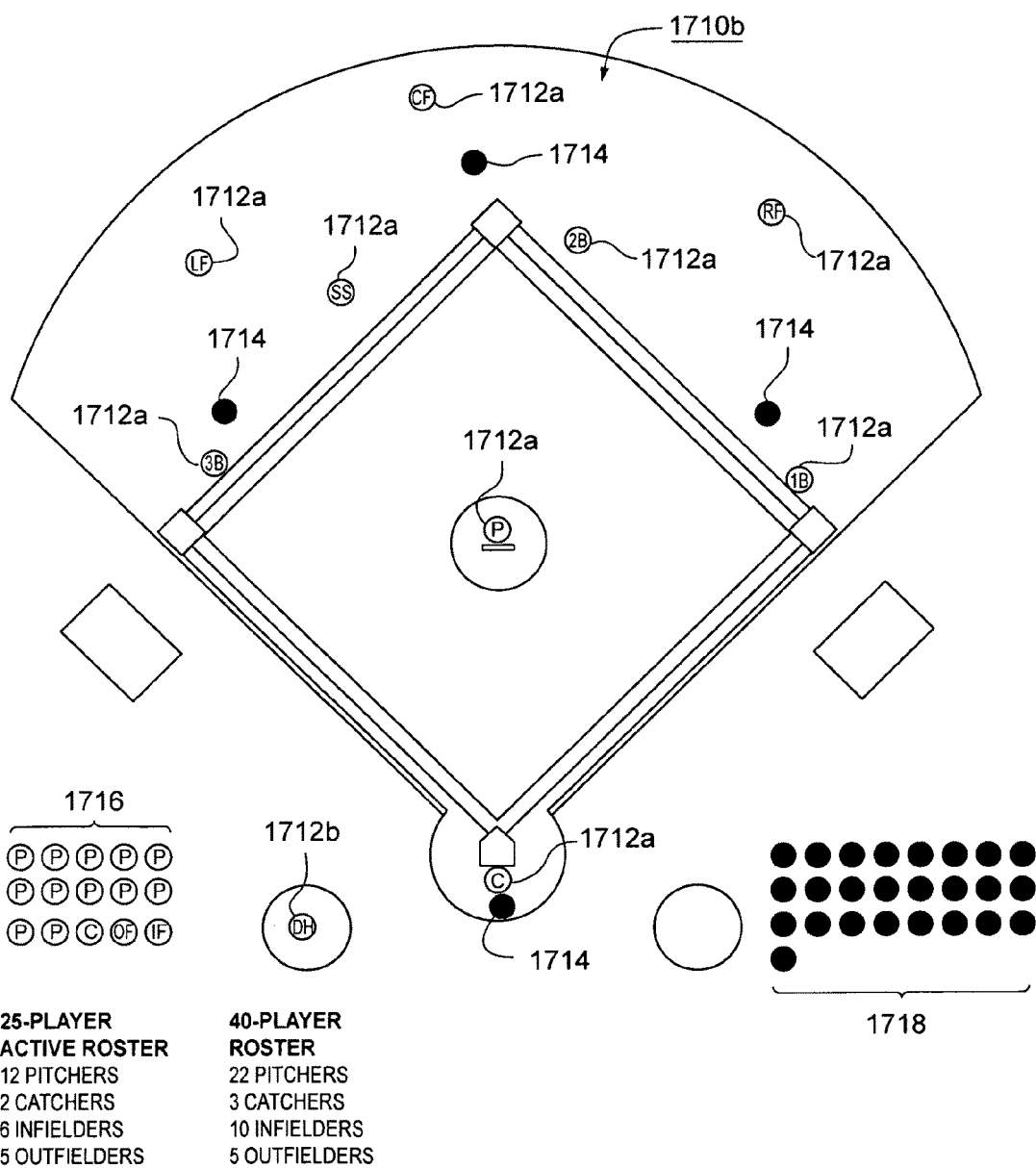
FIG. 17B is an illustrative screen for visualizing the performance of a team or portfolio using a baseball-like sports scenario, in accordance with an exemplary embodiment.

FIG. 17B is an illustrative screen for visualizing the performance of a team or portfolio using a baseball-like sports scenario, in accordance with an exemplary embodiment. A baseball field 1710b is shown, including the members of a first team 1712a in appropriate defensive positions. A player stock 1712b of a second team is shown warming up in the on-deck circle. The field also includes a number of "umpires" 1714. The display also includes an indication of the breakdown of a full 25-player "active roster," as well as a full 40-player roster. The players on the active roster not in the field may be displayed in dugout 1716. Because the remaining players are on the roster but are not active, in certain exemplary embodiment, their performances may or may not be viewable (in whole or in part) by the user. The players for the opposing team on the active roster may be displayed in opposing dugout 1718. As in the football-like scenario shown in FIG. 17A, a user may roll-over a position to see a player stock's performance, e.g., including a delayed or real-time quote. The amount of information may vary depending on the player stock's status (e.g., no information for inactive players, some information for active players, and the most information for fielded players, etc.).

In certain exemplary embodiments, only fielded players (or sometimes all active players) may be able to score runs for the team. Thus, certain exemplary embodiments may enable a user to substitute players. The substitutions may be made in accordance with the rules of the game. For example, a player may substitute players between innings, for "injuries" (e.g., a company going bankrupt, being pulled from the market, etc.), as pinch hitters or runners, etc. It will be appreciated that these and/or similar substitution rules can be applied to other games, as well. In certain exemplary embodiments, substitutions may not be possible during a game, and/or it may be necessary to keep a particular lineup for an entire week.

Because a real-life baseball game often does not include continuous action, the same might be true for an NML baseball-like scenario. To increase the interactivity and enjoyment of the game for users, various animations may be made throughout the game. For example, animation sequences may involve victory laps, umpires making calls when players "slide" (e.g., when there is close performance of a first baseman and a hitter, for example), a batter charging the mound when a pitcher hits the batter (e.g., when the pitcher performs poorly, either in absolute terms or in comparison to the batter), etc.

Figure 17C:
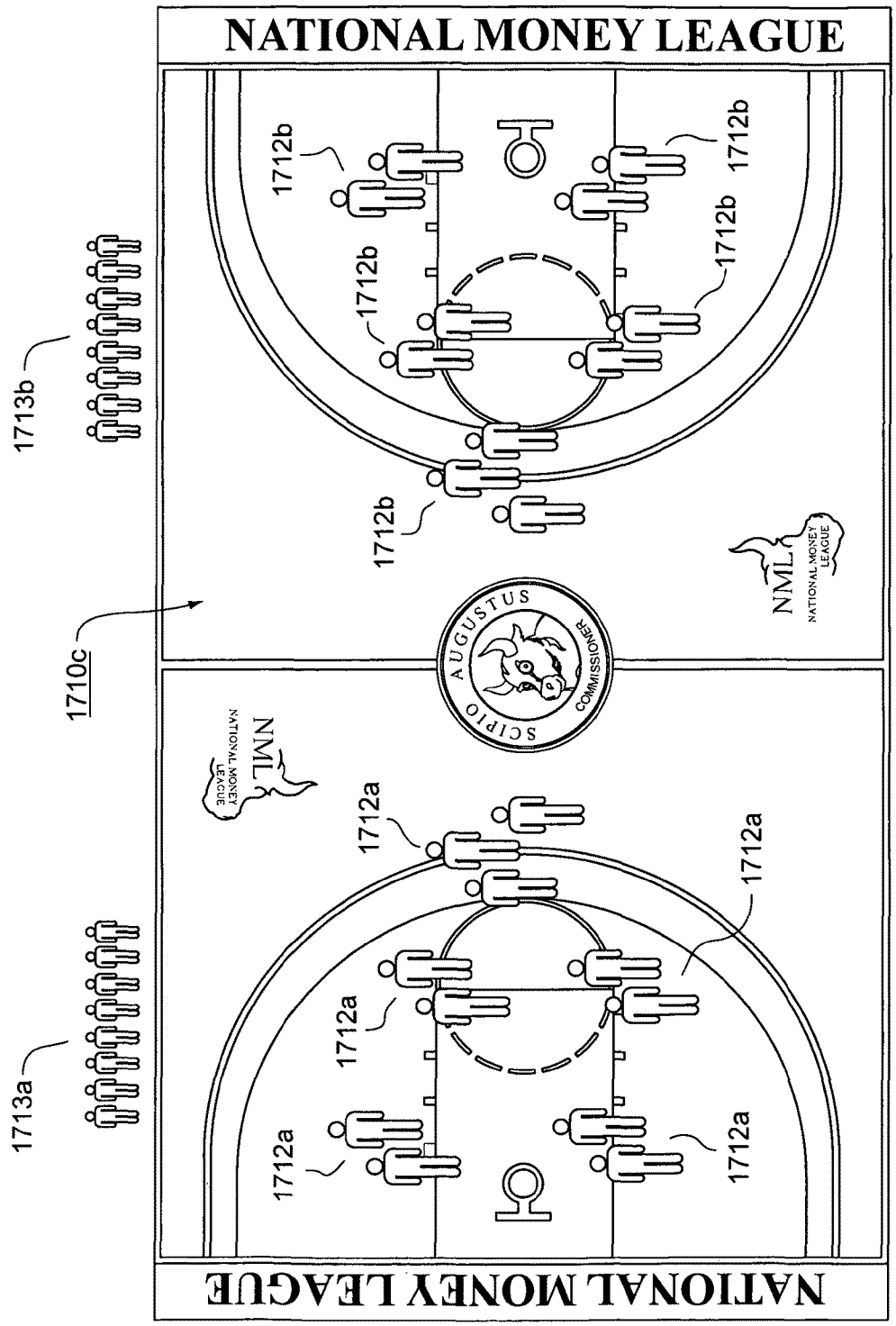
FIG. 17C is an illustrative screen for visualizing the performance of a team or portfolio using a basketball-like sports scenario, in accordance with an exemplary embodiment.

FIG. 17C is an illustrative screen for visualizing the performance of a team or portfolio using a basketball-like sports, scenario, in accordance with an exemplary embodiment. The basketball court 1710c includes player stocks of opposing teams 1712a and 1712b. Respective bench players 1713a and 1713b also are shown next to the court 1710c. In certain exemplary embodiments, the number of players for a particular team on a court 1710 may be increased (e.g., doubled, tripled, etc.) so as to provide more action for the users. In certain exemplary embodiments, to increase the number of active players, a normal team of five players may be on the court at any time, but a user may specify players to substitute for offensive and defensive possessions. Bench players also may take part in the competition, either directly or indirectly. For example, a bench player may commit a technical foul (e.g., if it performs poorly, receives negative press, violates an SEC or other regulation or law, etc.), may be shown running onto the court to celebrate a last-second shot, may instigate or participate in a fight, etc.

In certain exemplary embodiments, opposing teams may be shown on the same end of a court at the same time. The players may be matched-up according to their positions and may move in a back-and-forth manner. Alternatively, or in addition, as described above, the players may sometimes run plays, e.g., in dependence on their individual or combined performance.

Figure 17D:
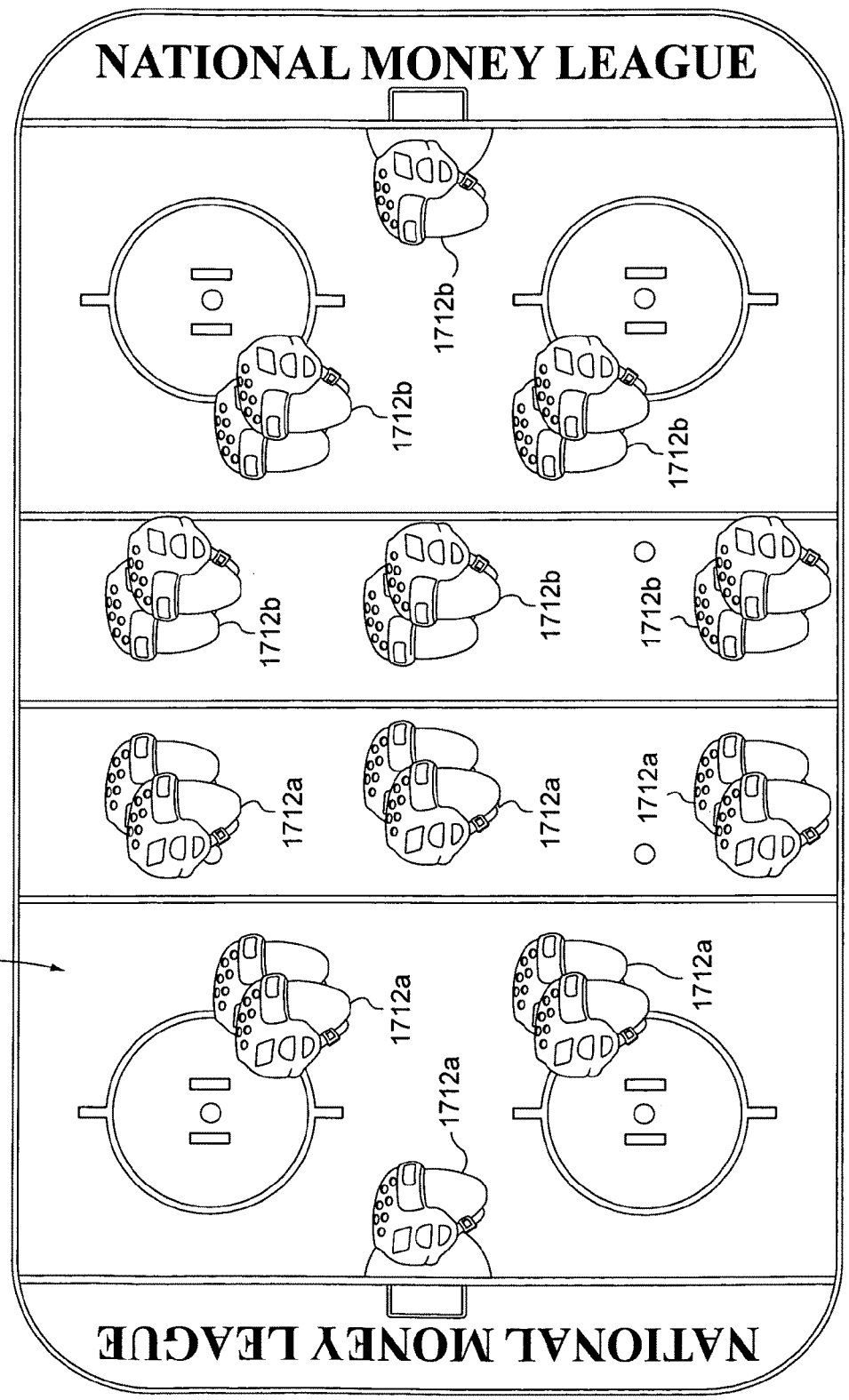
FIG. 17D is an illustrative screen for visualizing the performance of a team or portfolio using a hockey-like sports scenario, in accordance with an exemplary embodiment.

FIG. 17D is an illustrative screen for visualizing the performance of a team or portfolio using a hockey-like sports scenario, in accordance with an exemplary embodiment. As above, the players at the various positions on the ice 1710d may be increased, e.g., to increase the number of active player stocks. Also, as above, the players may be matched-up according to their positions and may move in a back-and-forth manner. Alternatively, or in addition, as described above, the players may sometimes run plays, e.g., in dependence on their individual or combined performance. A team performing well may be awarded a power play (e.g., a player stock of the opposing team may be put into a penalty box (not shown) and, similarly, a stock performing poorly may be put into the penalty box. Here, as elsewhere, the performance may be measured in absolute or relative terms. For example, "good" performance in certain exemplary embodiments may constitute exceeding the market average, exceeding the 10-week average for a particular stock, gaining more than a predetermined percent within a particular day or other period (e.g., more than 5%, 10%, etc.), out-performing an opposing stock by a predetermined amount or percent, etc. "Poor" performance in certain exemplary embodiments may be similar to the converse of these and/or other examples. In certain exemplary embodiments, a player stock may always be put into the penalty box to indicate which team is performing better over a predefined time interval.

FIG. 17E is an illustrative screen for visualizing the performance of a team or portfolio using a racing-like sports scenario, in accordance with an exemplary embodiment. It will be appreciated that the racetrack 1710d may be in any shape and the cars also may be suitably styled. For example, the racetrack 1710d and cars may be formatted for F1 racing, Indycar racing, drag racing, NASCAR or stockcar racing, etc. Teams may be comprised on teams of two or more cars, as is conventional in racing. Teams also may include a pit crew, a spotter, etc. For example, a well-performing pit crew may help a car go faster during the competition, whereas a poor performing pit crew may inject delays, may cause a tire to fall off during the course of the race, etc. Backup cars 1716 also may be garaged in case anything happens to a car during a season (e.g., is pulled from the market, etc.) or is substituted in for an existing car 1712. In certain exemplary embodiments, if the entire market is down, the race may be run under caution. To increase the excitement of a race, animations of pit stops, spin-outs, collisions, the crowd, etc., may be displayed for the user. Here, and for other games, custom animation events may be triggered randomly or in dependence on the performance of the particular stocks.

Figure 17F:
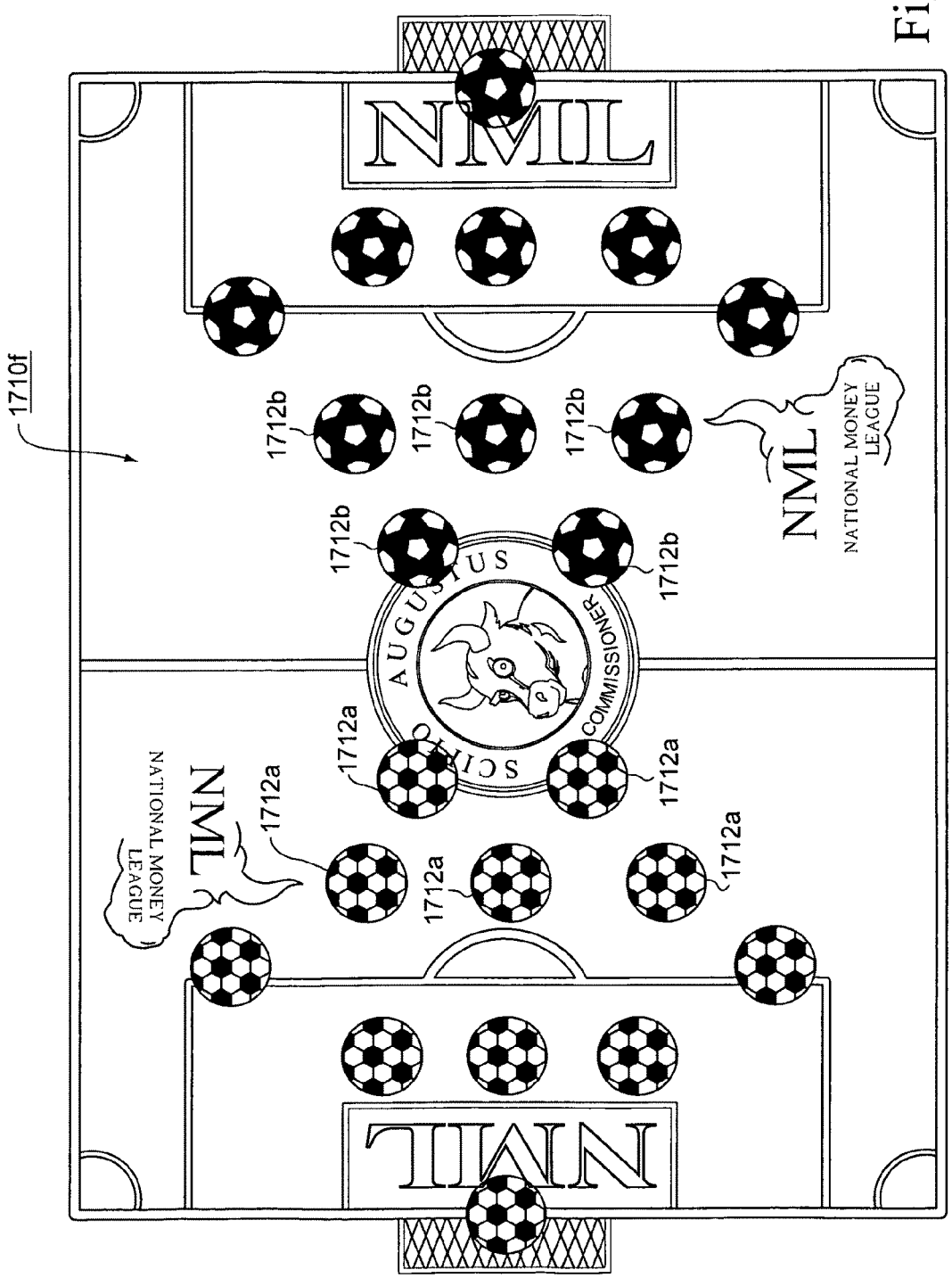
FIG. 17F is an illustrative screen for visualizing the performance of a team or portfolio using a soccer-like sports scenario, in accordance with an exemplary embodiment.

FIG. 17F is an illustrative screen for visualizing the performance of a team or portfolio using a soccer-like sports scenario, in accordance with an exemplary embodiment. The soccer field 1710f and the players 1712a and 1712b on the field 1710f may be made to perform similar to those in the football example shown in, and described in connection with, FIG. 17A above. Thus, the players 1712a and 1712b may be matched-up according to their positions and may move in a back-and-forth manner. Alternatively, or in addition, as described above, the players may sometimes run plays, e.g., in dependence on their individual or combined performance. Penalty kicks and/or corner kicks may be randomly chosen and/or provided in dependence on the performance of the player stocks individually or in combination. Shootouts may be performed in the teams are tied or close to tied at the end of a game to increase the enjoyment and sense of urgency in the game.

In many different types of real-world games, it is often believed that there is a home-field or home-team advantage. Thus, NML competitions may take place in various stadiums, arenas, ballparks, etc. The players may choose or be assigned a home location. When a game is played at a particular location, the "home team" may be given an advantage. For example, the home team may have an extra competitor playing, similar to a "6th Man" on the basketball court or a "12th Man" on the football field. A crowd may be added and may become more boisterous for the home team when it is winning or trying to rally back from a deficit, etc. In certain exemplary embodiments, the crowd may perform like one of the player stocks not currently on the field or court.

The Editable stock ticker also may be located at the bottom of the screen to provide further information in a different view.

5.3 Research and Analysis

By clicking on the "Research and Analysis" tab within a league, a user may be able to use a tool similar to one used by professional brokers. For example, this may include determining what criteria to use based on given conditions and values when searching for stocks. The criteria may include, for example, the exchanges, sectors, share price, market capitalization, earnings per share, 5-year annual income growth rate, institutional holdings, etc. FIG. 19 is an illustrative screen showing various research and analysis tools, in accordance with an exemplary embodiment. The display 1900 through the analysis tools 1902 also may allow conditions (such as equal to, less than, greater than, between, etc.) and ranges to be specified. Thus, for example, as shown in FIG. 19, it is possible to find all stocks traded on the NASDAQ exchange that fall within the technology sector, having a share price of $0 to $10, a market capitalization of $0 to $250 million, earnings per share of between $0 and $10, a 5 year annual income growth rate of between $1 and $100, considering institutional holdings of between $0 and $100.

5.4 Snap Quotes

Figure 20:
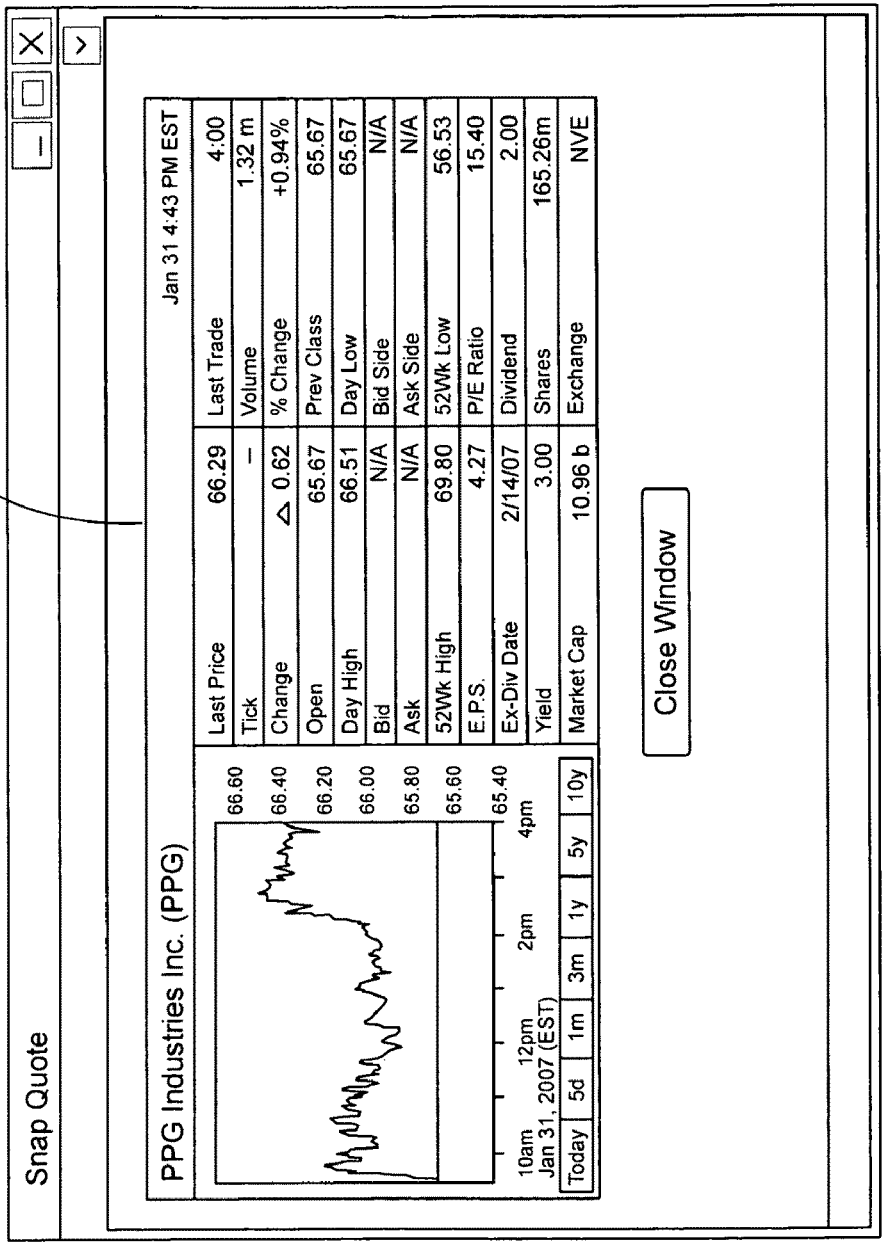
FIG. 20 is a display of a "snap quote," in accordance with an exemplary embodiment.

The snap quotes provide detailed information on individual stocks. The snap quotes may be accessed from stock symbols throughout the site. The snap quotes allow a user to view certain stock-related information, such as, for example, a growth chart based on today's, the 5-day, 1-month, 3-month, 1-year, and 5-year growth. A user also may view the last price, change in dollars/percentage, open, high, low, volume, market capital, PE Ratio, dividends, etc. From this screen, a user may view news, profile, financials, historical information, market information, etc. at the top of the snap quote for additional information. FIG. 20 is a display of a "snap quote," in accordance with an exemplary embodiment. The graph and stock market related metrics and statistics shown in the display 1500 are self-explanatory.

5.5 News

The National Money League may provide links and/or modules throughout the site for news and information regarding the stock market, financial and business, and/or sports. In certain exemplary embodiments, the news may be kept current using a commercially available feed (e.g., via an XML data link provided by QuoteMedia).

Figure 21:
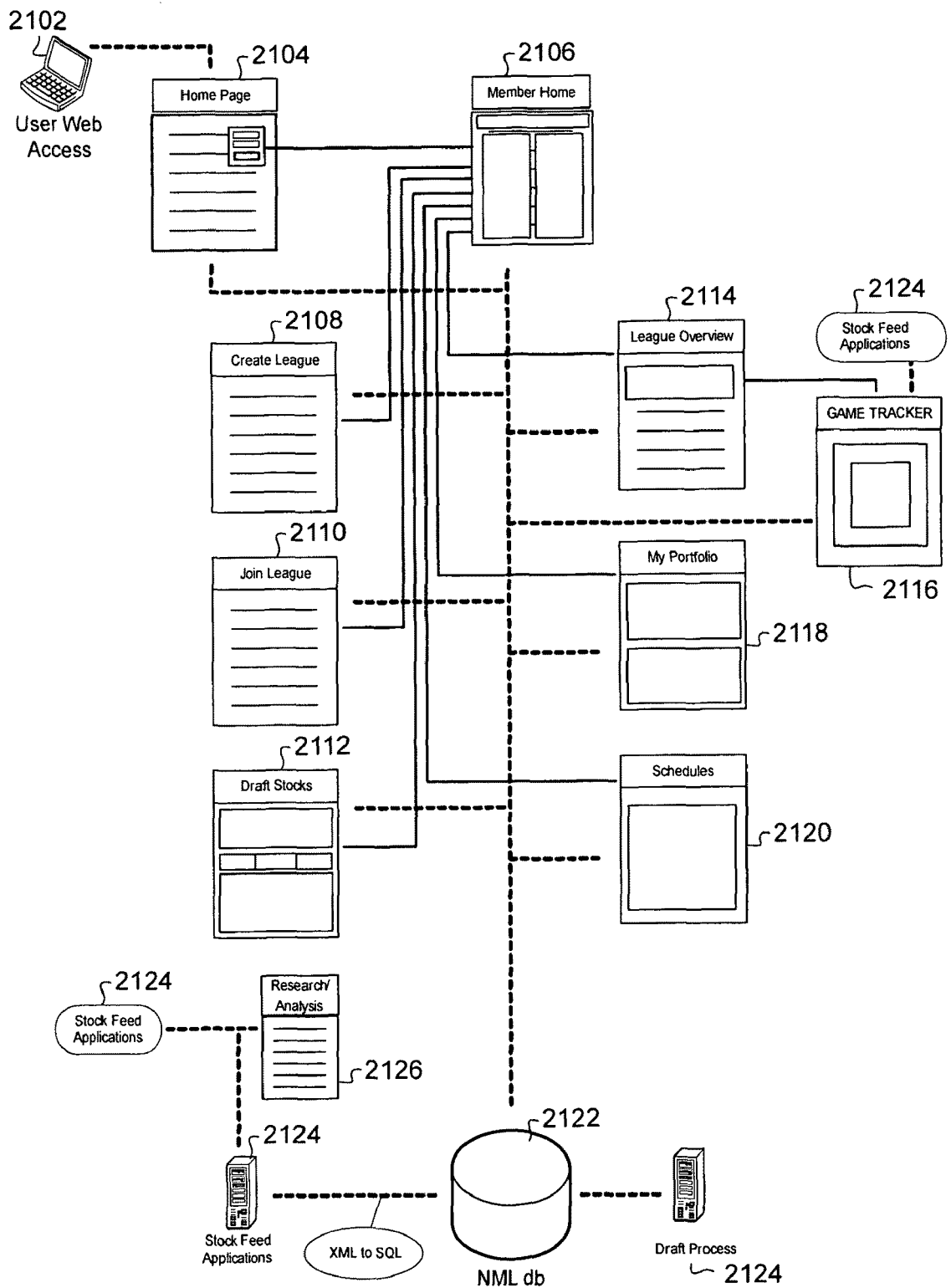
FIG. 21 is a flowchart showing the overall operation of the National Money League, in accordance with an exemplary embodiment.

6. Illustrative Flow through a System According to Certain Exemplary Embodiments FIG. 21 is a flowchart showing the overall operation of the National Money League, in accordance with an exemplary embodiment. In particular, FIG. 21 demonstrates the ways in which a user may navigate through a system according to certain exemplary embodiments. In general, the user may access the system through the Internet via a home computer, as shown in the upper left corner. The options available at and from each resulting screen are shown and described directly in FIG. 21 and above.

Figure 22:
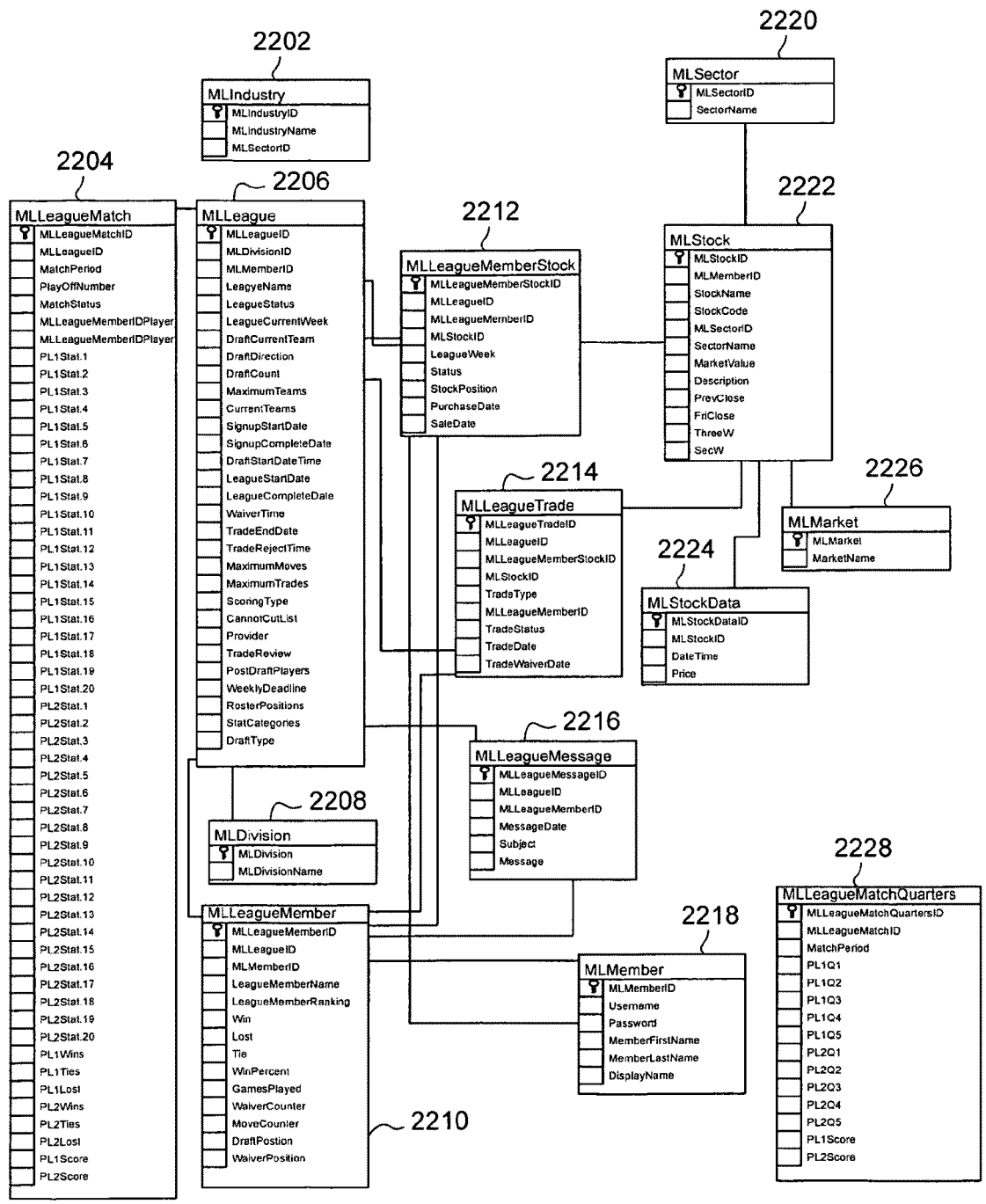
FIG. 22 is an illustrative database schema for the overall operation of the National Money League, in accordance with an exemplary embodiment.

It will be appreciated that much of the information is stored and/or accessed via a NML database, shown in the bottom-center of FIG. 21. FIG. 22 is an illustrative database schema for the overall operation of the National Money League, in accordance with an exemplary embodiment.

In FIG. 21, access to the NML is provided by a network-enabled computer 2102. The Home Page 2104 requires secure login to enter the member sections. The Member Home 2106 provides scrolling stock ticker information and Snap Quote access, a listing of all available member leagues and links to participate, and a scrolling news tool allowing detailed popup information. The Create League Display 2108 enables a member to create a league by setting, for example, name, start dates, and league size. The Join League Display 2110 enables a member to join leagues that are still in the "signup" phase. The Draft Stocks Display 2112 displays draft information such as, for example, the player currently drafting, stocks drafted, and position of draft pick. A hot performers tool is provided for all three sectors. Lists of available stocks that may be drafted are viewable, along with the sector, name, last trade, performance data, etc.

The League Overview 2114 displays league standings and provides links to current game scores. The Game Tracker 2116 is populated by Stock Feed Applications 2124 and enables a user to view the progress of the games. My Portfolio 2118 displays current stock lineup by league, game, or week, and allows a lineup to be changed by brining up bench and utility players. The Schedules Display 2120 displays match-ups, e.g., by using a "round robin" season generator.

A central NML database 2122 is provided, and is explained in greater detail below with reference to FIG. 22. The Draft Process Server 2124 enables players to chose to "auto draft" their league stocks, allowing the system to use predetermined criteria to draft by proxy when their turn comes. Tardy players will have stocks automatically drafted for them if they do not make a section 3 minutes after their turn arrives. Stock Feed Applications 2124 access stock feed applications, provide weekly closing feed for all stock symbols on Fridays, daily closing feed for all stock symbols, and hourly feed for all symbols included in active leagues. An XML-to-SQL translation may occur between the NML database 2122 and the Stock Feed Applications 2124. Research Analysis Display 2126 provides an R&A tool reachable from many places in the site.

In FIG. 22, the ML Industry table 2202 includes a description of the industries from the stock markets. The ML League Match table 2204 provides an area to determine the match-up for each of the teams, each week, that leads to wins and losses to determine playoffs. This area also determines winners and losers to determine match-ups for the playoffs. This is determined by stock statistics and wins and loses.

The ML League 2206 table allows users with League IDs to create a league, signup for a draft, and draft stocks to create a team. Information and rules are provided for signup. The draft order is determined, and the autodraft with time and manual draft properties are set. Stock information is provided and the current top stocks from each market. The ML Division table 2208 names the division for league play. The ML League Member table 2210 includes information pertaining to each individual teams win, loses, tie, winning percentage, rankings, move counter, waiver position, and/or other data. The ML League Member Stock table 2212 lists the individual stocks owned by a team and lists member information and stock price, position, and status.

In accordance with the ML League Trade table 2214, players can add and drop a stock from their team. The player "ID" is listed with the stocks information for trading (add/drop).

The ML League Message table 2216 stores league message and thus allows for communications to, among, and/or between all league members. The ML Member table 2218 associates the member's "Username," "Password," first and last name displayed, etc.

The ML Sector table 2220 includes a group of sectors that are represented in the game. The ML Stock table 2222 includes a listing of each stock from each market showing name, symbol, sector, price, market value, description, and various opening, and closing prices. The ML Stock Data table 2224 includes a listing of traded stocks and carries the symbol, date, and price. The ML Market table 2226 includes a description of the exchanges represented in the game (e.g., The New York Stock Exchange, NASDAQ, and The American Exchange). The ML League Match Quarters table 2228 accords with the "Play-by-Play" match-up that shows the players and their daily scores (quarters) and their weekly opponents.

Figure 23:
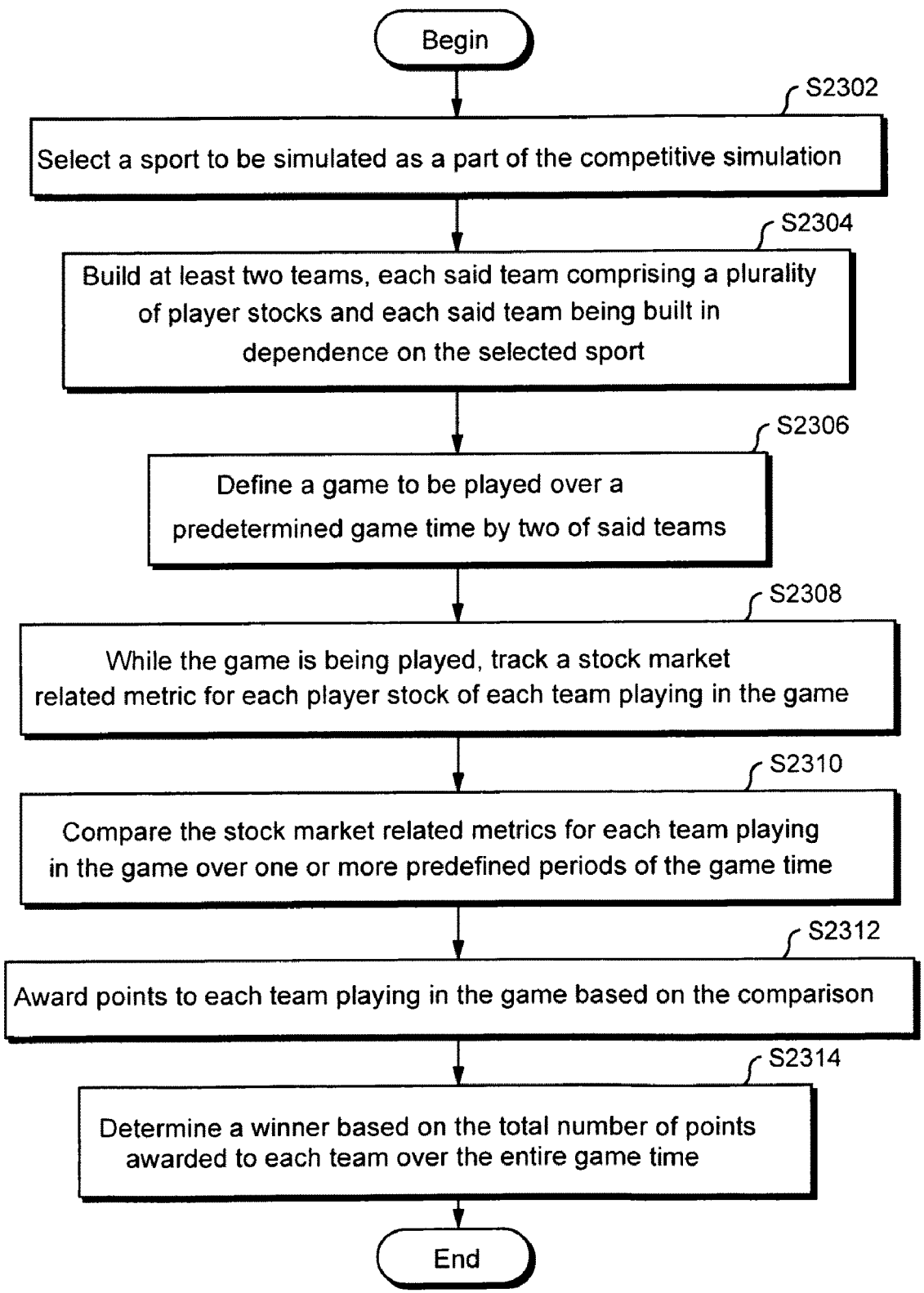
FIG. 23 is an illustrative flowchart showing an exemplary process for conducting a competitive simulation between a plurality of users with each user having an associated team, in accordance with an exemplary embodiment; and, FIG. 24 is an illustrative flowchart showing an exemplary process for performing a competitive simulation based on a sport, in accordance with an exemplary embodiment.

FIG. 23 is an illustrative flowchart showing an exemplary process for conducting a competitive simulation between a plurality of users with each user having an associated team, in accordance with an exemplary embodiment. In step S2302, a sport to be simulated as a part of the competitive simulation is selected. At least two teams are built in step S2304. Each team comprises a plurality of player stocks and each team is built in dependence on the selected sport. For example, a number of players consonant with the requirements of the real-world sport may be drafted to fill appropriate positions. In step S2306, a game to be played over a predetermined game time by two of said teams is defined. The competitive simulation may include a plurality of such games. While the game is being played, in step S2308, a stock market related metric for each player stock of each team playing in the game is tracked. In step S2310, the stock market related metrics for each team playing in the game are compared over one or more predefined periods of the game time. Points are awarded to each team playing in the game based on the comparison in step S2312. In step S2314, a winner is determined based on the total number of points awarded to each team over the entire game time. The comparison optionally may be displayed to a user, using sports-related imagery based on the sport selected.

Figure 24:
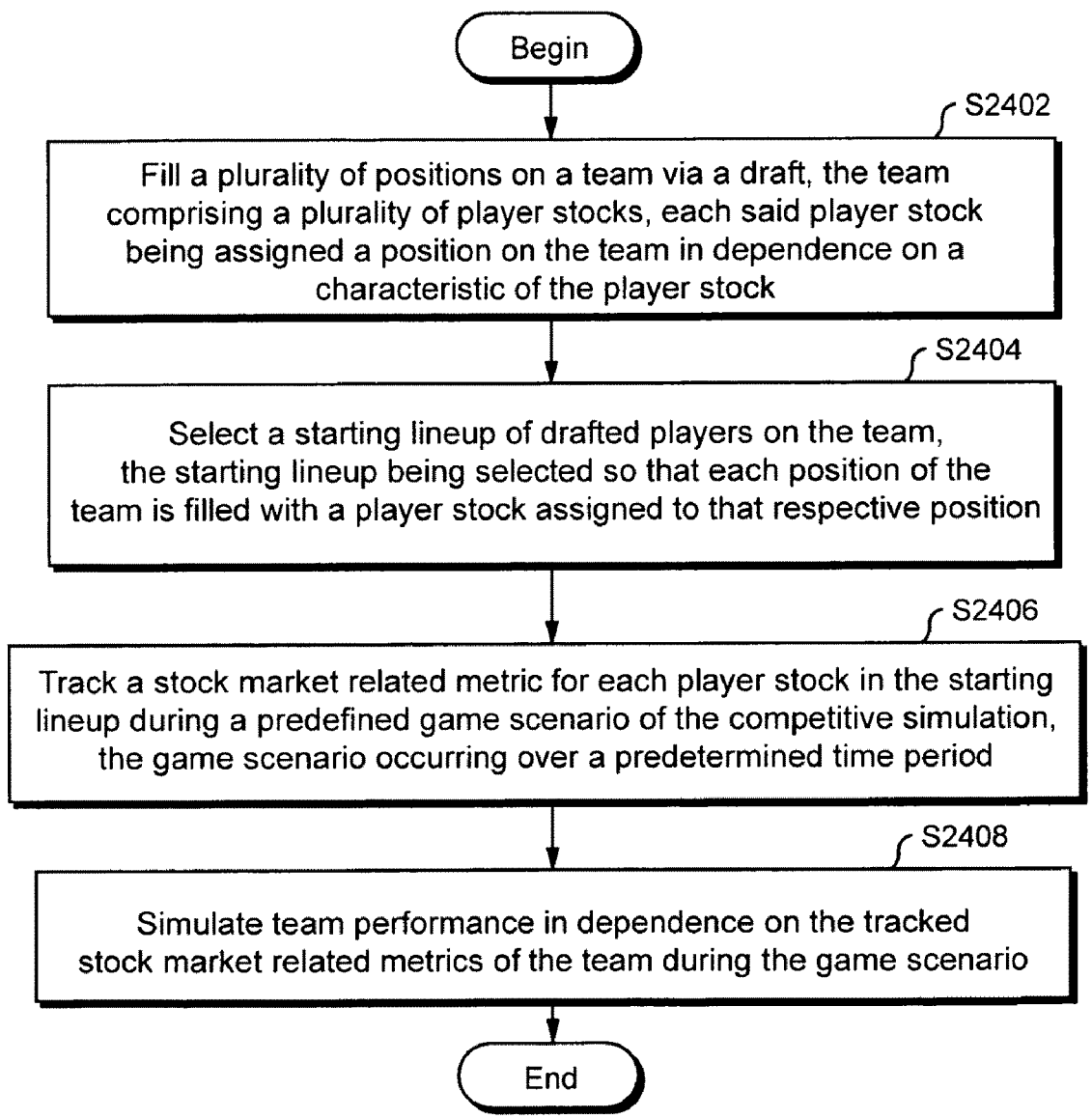

FIG. 24 is an illustrative flowchart showing an exemplary process for performing a competitive simulation based on a sport, in accordance with an exemplary embodiment. A plurality of positions on a team are filled (e.g., via a draft) in Step S2402. The team comprises a plurality of player stocks, with each player stock being assigned a position on the team in dependence on a characteristic of the player stock. In step S2404, a starting lineup of drafted players on the team is selected. The starting lineup is selected so that each position of the team is filled with a player stock assigned to that respective position. In step S2406, a stock market related metric for each player stock in the starting lineup is tracked during a predefined game scenario of the competitive simulation, with the game scenario occurring over a predetermined time period. Team performance is simulated in dependence on the tracked stock market related metrics of the team during the game scenario in step S2408. This may include visually displaying plays, e.g., based on a comparison of the performance of one or more player stocks on a first team to the performance of one or more player stocks on a second team.

It will be appreciated that the displays/screenshots described herein are provided by way of example and illustration, and without limitation. Many combinations and/or arrangements of the relevant information, and selection and action mechanisms, are contemplated herein. Moreover, certain exemplary embodiments are described with reference to web pages and/or websites; however, the present invention is not so limited. Indeed, any suitable combination of hardware, software, and/or other programmed logic circuitry may be used to provide the features needed for certain exemplary embodiments.

Also, it will be appreciated that a single user may compete against multiple teams created by that same user. Thus, it may be possible for a single user to compare the performance of various contemplated portfolios, with or without competing against others and/or bearing the full risk of the market.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. In a computer-mediated network environment comprising a plurality of computers, a method of conducting a competitive simulation between a plurality of users, each said user having an associated team, the method comprising:
   selecting a sport to be simulated as a part of the competitive simulation;
   enabling at least two teams to be built, each said team comprising a plurality of player stocks and each said team being built in dependence on the selected sport;
   defining games to be played over a predetermined game time by two of said teams;
   while a game is being played, tracking a stock market related metric for each player stock of each team playing in the game via at least one said computer;
   comparing, via the at least one said computer, the stock market related metrics for each team playing in the game over one or more predefined periods of the game time;
   awarding points to each team playing in the game based on the comparison; and
   determining a winner based on the total number of points awarded to each team over the entire game time via at least one said computer.

2. The method of claim 1, wherein the sport is at least one of football, basketball, baseball, racing, soccer, and ice hockey.

3. The method of claim 1, further comprising dividing built teams into one or more leagues, each said league having one sport associated therewith.

4. The method of claim 1, wherein the predetermined game time is a five-day period from Monday through Friday.

5. The method of claim 4, wherein each predefined period of the game time corresponds to one day.

6. The method of claim 1, wherein the stock market related metric of each player stock is purchase price of stock.

7. The method of claim 1, further comprising:
   causing the player stocks to be displayed on a field arranged according to the selected sport; and
   causing the displayed player stocks to be animated in dependence on the comparison.

8. The method of claim 7, further comprising comparing a player stock on a first team to a player stock of the second team located in a corresponding position on the field.

9. The method of claim 7, further comprising comparing multiple player stocks on each of the two teams, each said compared player stock of the two teams being in corresponding locations.

10. The method of claim 7, further comprising:
    matching a comparison to a predefined pattern; and
    causing a scripted animation to be displayed in dependence on the matched pattern.

11. A non-transitory computer readable storage medium tangibly storing instructions for performing a competitive simulation based on a sport, the instructions being executable so as to cause a computer in a network environment to at least:
    fill a plurality of positions on a team via a draft or enable the plurality of positions on the team to be filled via the draft, the team comprising a plurality of player stocks, each said player stock being assigned a position on the team in dependence on a characteristic of the player stock;
    enable a starting lineup of drafted players on the team to be selected so that each position of the team is filled with a player stock assigned to that respective position;
    track a stock market related metric for each player stock in the starting lineup during a predefined game scenario of the competitive simulation, the game scenario occurring over a predetermined time period; and
    simulate team performance in dependence on the tracked stock market related metrics of the team during the game scenario.

12. The computer readable storage medium of claim 11, wherein the team is rewarded with a bonus situation, the bonus situation being provided randomly or in dependence on a predetermined event.

13. The computer readable storage medium of claim 12, wherein the bonus situation is one or more of a corner-kick, a penalty kick, a free throw attempt, and a power play.

14. The computer readable storage medium of claim 11, wherein a team is penalized randomly or in dependence on a predetermined event.

15. The computer readable storage medium of claim 14, wherein the team is penalized with one or more of a technical foul, a player stock being placed in a penalty box, and an ejection of a player.

16. The computer readable storage medium of claim 11, wherein each said player stock is assigned to a position on the team in dependence on a sector of the player stock.

17. The computer readable storage medium of claim 11, wherein further instructions are executable so as to cause the computer in a network environment to cause the simulated team performance to be displayed on a field appropriate for the sport.

18. The computer readable storage medium of claim 11, wherein the starting lineup is changeable during a game via a substitution.

19. The computer readable storage medium of claim 11, wherein the player stocks on a team are changeable based on trades of the player stocks.

20. In a computer-mediated network environment comprising a plurality of computers, a method of conducting a competitive simulation between a plurality of users, each said user having an associated team, the method comprising:

selecting a sport to be simulated as a part of the competitive simulation, or enabling the sport to be simulated as the part of the competitive simulation to be selected;

enabling at least two teams to be built, each said team comprising a plurality of player stocks and each said team being built in dependence on the selected sport;

dividing built teams into one or more leagues, each said league having one sport associated therewith;

defining games to be played over a predetermined game time by two of said teams for each said league;

while a game is being played, tracking a stock market related metric for each player stock of each team playing in the game via at least one said computer;

comparing, via the at least one said computer, prices of the player stocks for each team playing in the game over one or more predefined periods of the game time;

awarding points to each team playing in the game based on the comparison;

determining, via the at least one said computer, a winner based on the total number of points awarded to each team over the entire game time;

causing the player stocks on a field arranged according to the selected sport to be displayed; and causing the displayed player stocks to be animated in dependence on the comparison.

\* \* \* \* \*